(12) United States Patent
Murai et al.

(10) Patent No.: US 7,321,409 B2
(45) Date of Patent: *Jan. 22, 2008

(54) TRANSFLECTIVE LIQUID CRYSTAL DEVICE AND ELECTRONIC APPARATUS USING THE SAME

(75) Inventors: Ichiro Murai, Chino (JP); Tomoyuki Itoh, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 319 days.

This patent is subject to a terminal disclaimer.

(21) Appl. No.: 11/129,460

(22) Filed: May 16, 2005

(65) Prior Publication Data

US 2005/0213005 A1   Sep. 29, 2005

Related U.S. Application Data

(62) Division of application No. 10/440,274, filed on May 19, 2003, now Pat. No. 6,977,701.

(30) Foreign Application Priority Data

May 24, 2002   (JP)   ............................. 2002-151379

(51) Int. Cl.
G02F 1/1335   (2006.01)
(52) U.S. Cl. ...................................................... 349/114
(58) Field of Classification Search ................ 349/114
See application file for complete search history.

(56) References Cited

U.S. PATENT DOCUMENTS

| 6,476,889 | B2 | 11/2002 | Urabe et al. |
| 6,570,634 | B2 | 5/2003 | Kim |
| 6,697,135 | B1 | 2/2004 | Back et al. |
| 6,753,939 | B2 | 6/2004 | Jisaki et al. |
| 6,864,945 | B2 | 3/2005 | Fujimori et al. |
| 6,894,745 | B2 | 5/2005 | Fujimori et al. |
| 6,977,701 | B2 * | 12/2005 | Murai et al. ................. 349/114 |
| 2003/0030767 | A1 | 2/2003 | Takizawa et al. |
| 2005/0036086 | A1 | 2/2005 | Kim et al. |

FOREIGN PATENT DOCUMENTS

| JP | A 61-173221 | 8/1986 |
| JP | 10-068955 | 3/1998 |
| JP | 2000-187224 | 7/2000 |

(Continued)

*Primary Examiner*—James A. Dudek
(74) *Attorney, Agent, or Firm*—Oliff & Berridge, PLC

(57) ABSTRACT

The invention provides a transflective liquid crystal device and an electronic apparatus using the same which do not cause a non-uniformity in the substrate gap, even though a layer-thickness adjusting layer is formed so that the layer thickness balance of a liquid crystal layer between a transmission display region and a reflection display region is optimized thereby. Below a counter electrode of a counter substrate of a transflective liquid crystal device, a color filter for transmission display, being thin and having a wide chromaticity region, is formed in a transmission display region, and a color filter for reflection display, being thick and having a narrow chromaticity region, is formed in a reflection display region. Further, the interval between a TFT array substrate and the counter substrate is adjusted by a columnar protrusion formed on the TFT array substrate, and a gap material is not dispersed between the TFT array substrate and the counter substrate.

3 Claims, 13 Drawing Sheets

FOREIGN PATENT DOCUMENTS

| | | |
|---|---|---|
| JP | 2001-021902 | 1/2001 |
| JP | A-2001-166289 | 6/2001 |
| JP | A-2001-272674 | 10/2001 |
| KR | 2001-084736 | 9/2001 |
| KR | 2001-096808 A | 11/2001 |
| KR | 2002-0018047 | 3/2002 |

* cited by examiner

TRANSFLECTIVE LIQUID CRYSTAL DEVICE AND ELECTRONIC APPARATUS USING THE SAME

CROSS-REFERENCE TO RELATED APPLICATION

This is a Division of application Ser. No. 10/440,274 filed May 19, 2003 now U.S. Pat. No. 6,977,701. The entire disclosure of the prior application is hereby incorporated by reference herein in its entirety.

BACKGROUND OF THE INVENTION

1. Field of Invention

The present invention relates to a transflective liquid crystal device having a reflection display region and a transmission display region in one pixel. The invention also relates to electronic apparatuses including the same.

2. Description of Related Art

Related art liquid crystal devices that are capable of displaying images in both a transmission mode and a reflection mode are referred to as transflective liquid crystal devices, and can be used in many applications.

In such a transflective liquid crystal device, as shown in FIG. 21, an active matrix-type transflective liquid crystal device includes a TFT array substrate 10 (first transparent substrate) having a transparent pixel electrode 9a (first transparent electrode) and a pixel-switching TFT (Thin Film Transistor) 30 formed on the surface, a counter substrate 20 (second transparent substrate) having a counter electrode 21 (second transparent electrode) and a color filter 24, and a liquid crystal layer 50 held between the substrates 10 and 20. The substrate gap between the TFT array substrate 10 and the counter substrate 20 is defined by dispersing gap material 5 having a predetermined particle size on the surface of one of the substrates, and then sealing the TFT array substrate 10 and the counter substrate 20 by sealing material (not shown).

In such a liquid crystal device structured as above, the TFT array substrate 10 includes a light reflecting film 8a having a reflection display region 100b formed in a pixel 100 in which a pixel electrode 9a faces the counter electrode 21, a transmission display region 100c formed in the remaining region (light transmitting window 8d) where the light reflecting film 8a is not formed.

Therefore, with regard to the light emitted from a backlight apparatus (not shown) disposed on the back side of the TFT array substrate 10, the light incident into the transmission display region 100c, as indicated by arrow LB, is incident from the TFT array substrate 10 into the liquid crystal layer 50, and is light-modulated in the liquid crystal layer 50, and then is emitted from the counter substrate 20 as a transmission display light to display images (transmission mode).

Further, with regard to the external light incident from the counter substrate 20, the light incident into the reflection display region 100b, as indicated by arrow LA, passes through the liquid crystal layer 50, reaches the light reflecting film 8a, is reflected from the light reflecting film 8a, passes through the liquid crystal layer 50 again, and then is emitted from the counter substrate 20 as a reflecting display light to display images (reflection mode).

When performing the light modulation, if a twist angle of a liquid crystal is set to be small, the changes of the polarization state is shown as a function of multiplying the difference of an index of refraction $\Delta n$ by the layer thickness "d" of the liquid crystal layer 50 (retardation ($\Delta n \cdot d$)), and therefore, if the value is enhanced or optimized, a visibility of display becomes better.

However, in the transflective liquid crystal device, since the reflection display light passes through the liquid crystal layer 50 twice, while the transmission display light is emitted by passing through the liquid crystal layer 50 once, it is difficult to optimize the retardation ($\Delta n \cdot d$) in both of the transmission display light and the reflection display light. Therefore, if the layer thickness "d" of the liquid crystal layer 50 is determined such that the display visibility in the reflection mode is enhanced, the display in the transmission mode is sacrificed. Or if the layer thickness "d" of the liquid crystal layer 50 is determined such that the display visibility in the transmission mode is enhanced, the display in the reflection mode is sacrificed.

Therefore, with regard to the TFT array substrate 10, a thick layer-thickness adjusting layer can be formed below the light reflecting layer 8a defining the reflection display region 100b, and the layer thickness "d" of the liquid crystal layer 50 in the reflection display region 100b be made thinner than the layer thickness "d" of the liquid crystal layer 50 in the transmission display region 100c.

Such a related art method is disclosed in Japanese Unexamined Patent Application Publication No. 61-173221.

SUMMARY OF THE INVENTION

However, if the retardation ($\Delta n \cdot d$) is enhanced or optimized by forming the layer-thickness adjusting layer, an unevenness is formed on the surface of the substrate due to the layer-thickness adjusting layer. As a result, even though trying to control the TFT array substrate 10 and the counter substrate 20 by dispersing a gap material 5 on the surface of the counter substrate 20, or when assembling a liquid crystal device, the gap material comes into a concave portion generated due to the layer-thickness adjusting layer so that the non-uniformity of the substrate gap occurs during the process of manufacturing a liquid crystal device or after the liquid crystal device is manufactured, which results in a problem in which the retardation ($\Delta n \cdot d$) cannot be held in an enhanced or optimum state.

Furthermore, if the thick layer-thickness adjusting layer is formed on the TFT array substrate 10 in spite of a photolithography process performed to form a TFT to provide pixel 30 switching or the light reflecting film 8a, a considerable difference of altitude or step occurs on the TFT array substrate 10. As a result, the exposure preciseness, etc. of the photolithography process is considerably lowered, and step fragments or film residues are generated so that the reliability of the liquid crystal device or the production yield decreases.

The present invention addresses or solves the above and/or other problems, and provides a transflective liquid crystal device and an electronic apparatus using the same, in which the non-uniformity of the substrate gap is not generated even when the layer thickness balance of the liquid crystal layer between the transmission display region and the reflection display region is enhanced or optimized by the layer-thickness adjusting layer.

Further, the present invention provides a transflective liquid crystal device and an electronic apparatus using the same in which the exposure preciseness is not lowered when forming a pixel switching element, etc. by using a photolithography technology, even when the layer thickness balance of the liquid crystal layer between the transmission display region and the reflection display region is enhanced or optimized by the layer-thickness adjusting layer.

To address or solve the above, the present invention provides a transflective liquid crystal device including a first transparent substrate having first transparent electrodes and pixel switching elements formed on the surface in a matrix, a second transparent substrate having second transparent electrodes formed on the surface, facing the first transparent electrodes, and a liquid crystal layer held between the first transparent substrate and the second transparent substrate, and a light reflecting layer is formed on the first transparent substrate, the light reflecting layer having a reflection display region in a pixel in which the first transparent electrode faces the second transparent electrode, and a transmission display region formed in the remaining region of the pixel. The first transparent substrate and the second transparent substrate may be formed such that the layer thickness of the liquid crystal layer in the reflection display region is thinner than the layer thickness of the liquid crystal layer in the transmission display region, and a columnar protrusion may be formed on the surface facing the liquid crystal layer of at least one of the first transparent substrate and the second transparent substrate, the columnar protrusion defining the substrate gap between the first transparent substrate and the second transparent substrate by protruding from one of the substrates and abutting against the other substrate.

According to the present invention, in the first transparent substrate or the second transparent substrate, since the layer thickness of the liquid crystal layer is made to be thinner in the reflection display region than the layer thickness of the liquid crystal layer in the transmission display region, and even if the reflection display light passes through the liquid crystal layer twice while the transmission display light is emitted out after passing through the liquid crystal layer only once, the retardation ($\Delta n \cdot d$) can be enhanced or optimized in both of the transmission display light and the reflection display light. Further, by adjusting the thickness of the liquid crystal layer, even though an unevenness is formed on the first transparent substrate or the second transparent substrate, according to the present invention, the substrate gap can be adjusted by the columnar protrusion formed on the first transparent substrate or the second transparent substrate, and a gap material is not dispersed. Due to such a structure, the non-uniformity of the substrate gap does not occur due to the gap material coming into a concave portion of the unevenness formed by the layer-thickness adjusting layer between the first transparent substrate and the second transparent substrate, the retardation ($\Delta n \cdot d$) can be held in an enhanced or optimum state. Therefore, a high quality display can be performed.

According to the present invention, in adjusting the thickness of the liquid crystal layer, for example, on the surface facing the liquid crystal layer of the first transparent substrate, the total thickness of the films formed below the first electrode is thicker in the reflection display region than in the transmission display region. Further, on the surface of the second transparent substrate facing the liquid crystal layer, the total thickness of the films formed below the second electrode can be thicker in the reflection display region than in the transmission display region.

As structured above, for example, on the surface facing the liquid crystal layer of one transparent substrate of the first transparent substrate and the second transparent substrate, a layer-thickness adjusting layer is preferably formed, such that the layer thickness of the liquid crystal layer in the reflection display region is thinner than the layer thickness of the liquid crystal layer in the transmission display region.

The layer-thickness adjusting layer is preferably formed on the second transparent substrate. That is, in the case that the first transparent substrate is a TFT array substrate, since a photolithography process is performed on the TFT array substrate to form a TFT for switching pixel or a light reflecting film, if a thick layer-thickness adjusting layer is formed on the TFT array substrate, a considerable difference of altitude or step occurs. As a result, the exposure preciseness, etc. of the photolithography process is considerably lowered, and step fragments or film residues are generated. Accordingly, reliability or the production yield of the liquid crystal device decreases. However, according to the present invention, by forming the layer-thickness adjusting layer on the second transparent substrate, that is, on the substrate in which the TFT to provide pixel switching is not formed, the layer thickness of the liquid crystal layer in the reflection display region is made to be thinner than the layer thickness of the liquid crystal layer in the transmission display region. Due to such a structure, even though the layer-thickness adjusting layer is provided, the exposure preciseness in a photolithography process to form a pixel switching element on the first transparent substrate does not decrease. Therefore, a transflective liquid crystal device having a high reliability and a high quality of display can be provided.

According to the present invention, the layer-thickness adjusting layer is a transparent layer which is selectively formed in, for example, the reflection display region in the pixel, or is a transparent layer which is thickly formed in the reflection display region, and is formed thinner in the transmission display region than in the reflection display region.

According to the present invention, when performing a color display, a color filter is formed in the pixel on the surface facing the liquid crystal layer of the second transparent substrate.

When forming such a color filter, a color filter for transmission display is preferably formed above or below the transparent layer in the transmission display region in the pixel, and a color filter for reflection display is preferably formed in the reflection display region on the same side as the color filter for transmission display for the transparent layer.

Further, on the surface facing the liquid crystal layer of the second transparent substrate, a color filter for transmission display is preferably formed above or below the transparent layer in the transmission display region in the pixel, and a color filter for reflection display is preferably formed in the reflection display region on the side opposite to the color filter for transmission display for the transparent layer.

In the present invention, a chromaticity region of the color filter for transmission display is preferably wider than that of the color filter for reflection display. In the transflective liquid crystal device, since the reflection display light passes through the color filter twice while the transmission display light is emitted out after passing through the color filter only once, if the color filter for transmission display is made to have a wider chromaticity region than the color filter for reflection display, images can be displayed with the same color in both of the transmission display light and the reflection display light.

"A wide chromaticity region" in the specification of the present invention means that the area of a color triangle shown in, for example, a CIE1931rgb colorimetric system chromaticity diagram is large, and has a dark color tone.

In the present invention, the color filter for transmission display preferably has a wide chromaticity region, for example, due to different kinds of color materials or blending amount from those of the color filter for reflection display. That is, if layer thickness of the color filter for transmission display is made to be thicker than that of the color filter for reflection display to widen the chromaticity region, the effect by the layer-thickness adjusting layer can be damaged. However, if the chromaticity region of the color filter for transmission display is made to be wider than that of the color filter for reflection display due to different kinds of color materials or blending amount, the damage of the effect by the layer-thickness adjusting layer does not occur. On the contrary, layer thickness of the color filter for reflection display can be made to be thicker than that of the color filter for transmission display, and therefore, the layer thickness balance of the liquid crystal layer between the transmission display region and the reflection display region can be enhanced or optimized by the layer thickness difference of the color filters.

The layer-thickness adjusting layer of the present invention may include a color filter for transmission display being thinly formed in the transmission display region, and a color filter for reflection display being formed thicker in the reflection display region than the color filter for transmission display, of the pixel. Constructed as above, the number of manufacturing processes does not increase since it is not necessary to newly add a layer-thickness adjusting layer.

In the present invention, when using the color filter as a layer-thickness adjusting layer, the color filter for transmission display may preferably include a first color material layer being thin and having a wide chromaticity region, and the color filter for reflection display may preferably include a second color material layer being thicker and having a narrower chromaticity region than the first color material layer. In the transflective liquid crystal device, since the reflection display light passes through the color filter twice while the transmission display light is emitted out after passing through the color filter only once, if the color filter for transmission display is made to have a wider chromaticity region than the color filter for reflection display, images can be displayed with the same color in both of the transmission display light and the reflection display light.

Further, according to the present invention, the color filter for transmission display may include a first color material layer, and the color filter for reflection display may include a first color material layer integrally formed with the color filter for transmission display, and a second color material layer formed above or below the first color material layer.

The liquid crystal device according to the present invention can be used as a display unit of an electronic apparatus, such as a mobile phone, a potable computer, etc.

DETAILED DESCRIPTION OF PREFERRED EMBODIMENTS

Figure 1:
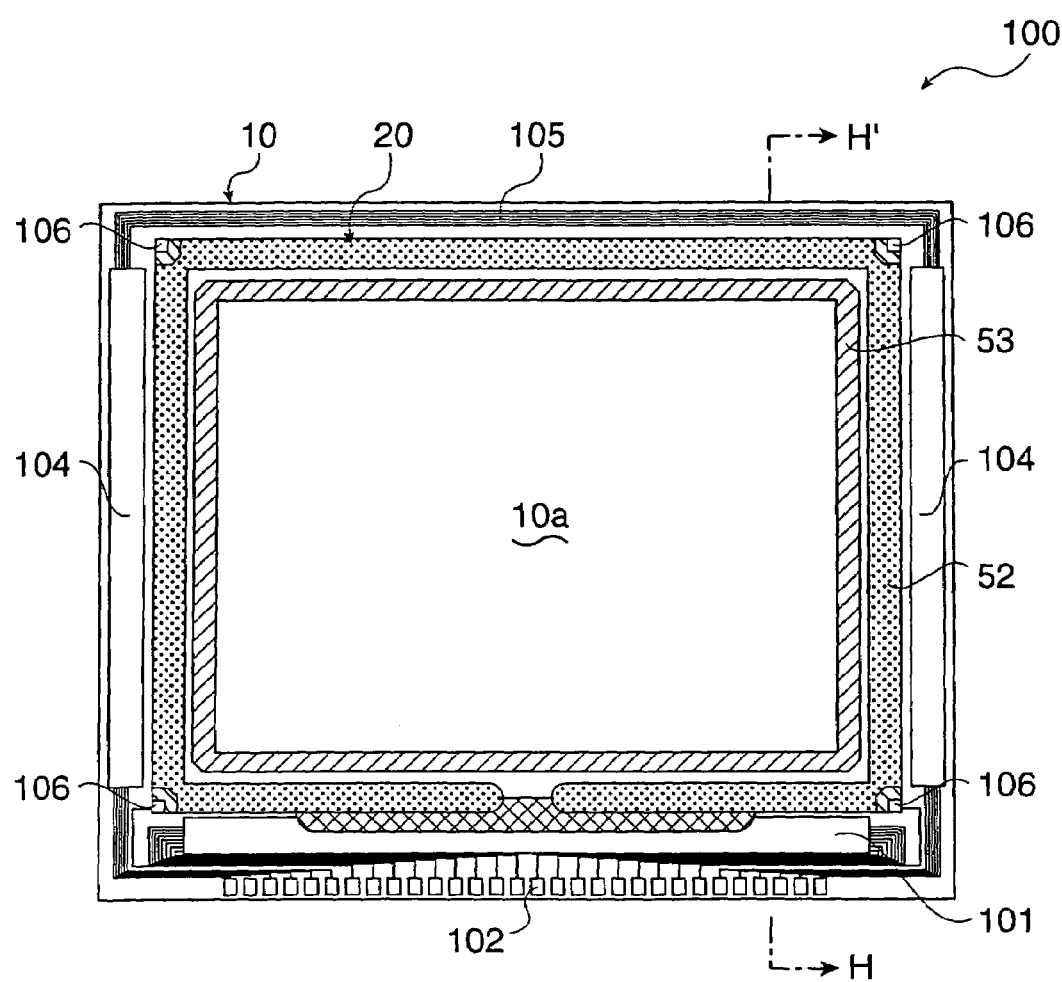
FIG. 1 is a plan view of a transflective liquid crystal device according to the present invention as viewed at a counter substrate.

Exemplary embodiments of the present invention are explained in detail below with reference to the drawings. Further, in the drawings of the following description, the scales of the respective layers or members are different, since each layer or member is just drawn with a size to be recognizable in the drawings.

First Exemplary Embodiment (Basic Structure of a Transflective Liquid Crystal Device)

Figure 2:
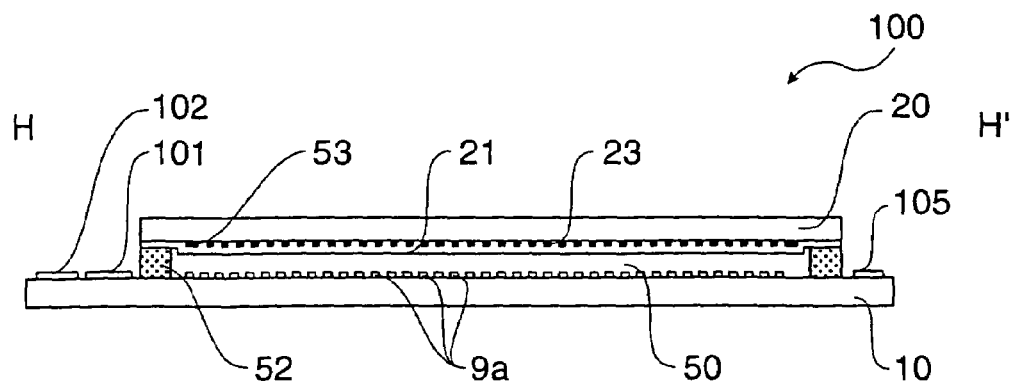
FIG. 2 is a sectional view of FIG. 1 taken along plane H-H' of FIG. 1.
Figure 3:
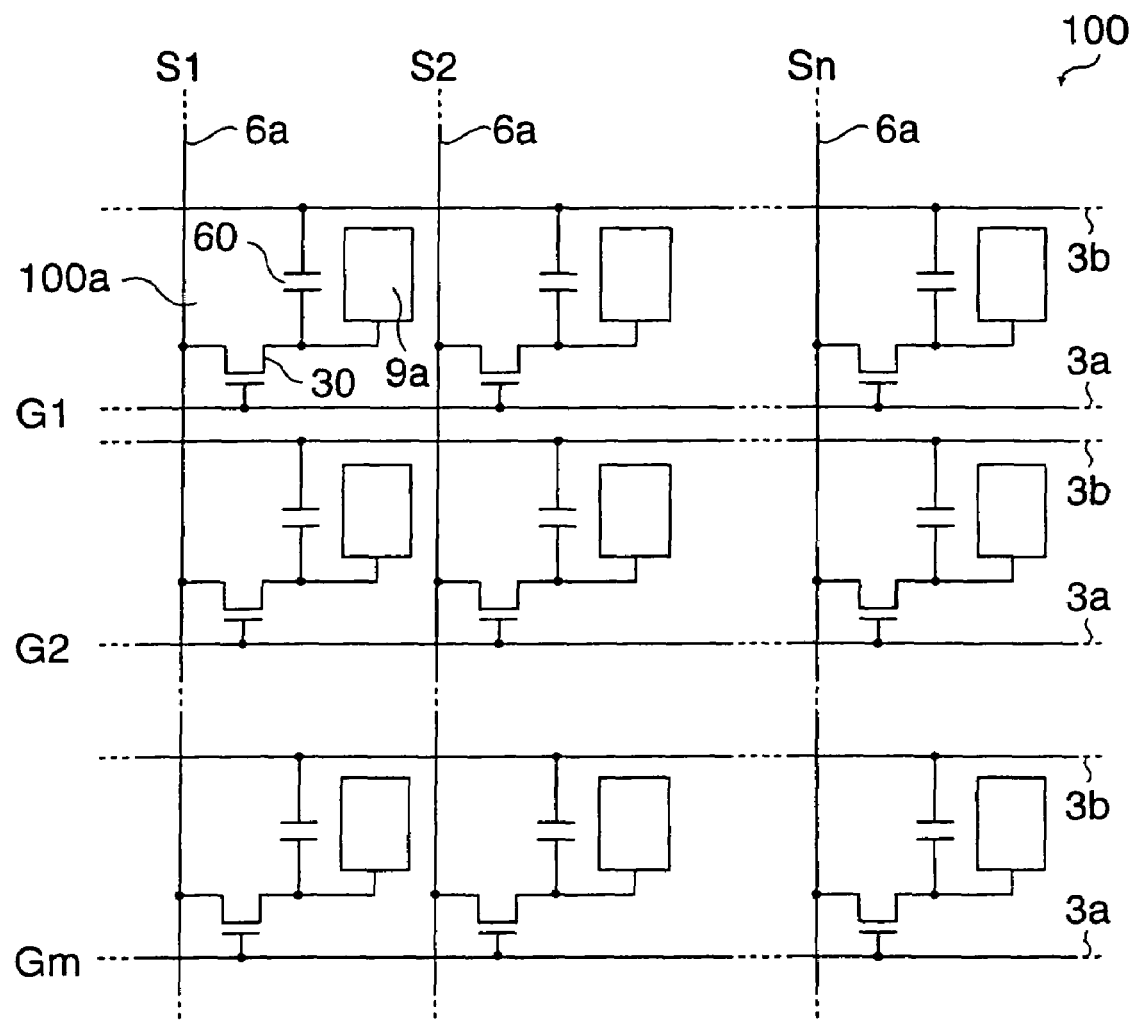
FIG. 3 is a schematic circuit diagram showing component elements, etc. formed on a plurality of pixels in a matrix shape in the transflective liquid crystal device.

FIG. 1 is a plan view of a transflective liquid crystal device according to the present invention as viewed at component elements and a counter substrate, and FIG. 2 is a sectional view taken along plane H-H' of FIG. 1. FIG. 3 is a schematic circuit diagram showing various elements, wirings, etc. in a plurality of pixels formed in a matrix shape in the image display region of the transflective liquid crystal device. Further, in the following description, the scales of layers or members in each of the drawings are different since each layer or member is merely drawn with a size to be recognizable in the drawings.

As shown in FIGS. 1 and 2, a transflective liquid crystal device 100 of the present invention is configured such that a liquid crystal layer 50 as an electric optical material is held between a TFT array substrate 10 (a first transparent substrate) and a counter substrate 20 (a second transparent substrate) which are sealed by a sealing material 52, and a peripheral partition 53 made of a light shielding material is formed in the inner region of the portion formed by the sealing material 52. A data line driving circuit 101 and a mounting terminal 102 are formed in the external region of the portion formed by the sealing material 52 along one side of the TFT array substrate 10, and a scanning line driving circuit 104 is formed along two sides neighboring one side respectively. A plurality of wirings 105 are provided on the rest of the one side of the TFT array substrate 10 to connect between the scanning line driving circuits 104 provided in both sides of the image display region, and additionally, a pre-charge circuit or a test circuit can be provided by using the downside of the peripheral partition 53, or the like. Further, an up-down conductive material 106 is formed on at least one of the corner portions of the counter substrate 20 to provide an electrical conduction between the TFT array substrate 10 and the counter substrate 20. Further, the data line driving circuit 101 and the scanning line driving circuit 104, etc. can be overlapped with the sealing material 52, or can be formed in the portion in the inner region of the sealing material 52.

Further, instead of forming the data line driving circuit 101 and the scanning line driving circuit 104 on the TFT array substrate 10, for example, a TAB (tape automated bonding) substrate having a driving LSI provided thereon, can be provided to be electrically or mechanically connected with a terminal group provided in the peripheral region of the TFT array substrate 10 through an anisotropic conductive film. Further, in the transflective liquid crystal device 100, a polarizing film, a phase difference film, a polarizing plate, etc. can be arranged in a predetermined direction according to the types of the liquid crystal layer 50 being used, that is, an operation mode, such as a TN (twisted nematic) mode, a STN (super TN) mode, etc., or each of normally white mode/normally black mode. However, the illustration thereof is omitted. Further, in the case of forming the transflective liquid crystal device 100 for color display, each color filter of RGB is formed on the counter substrate 20 along with its protecting film in the region facing each pixel electrode 9a on the TFT array substrate 10 as described below.

In the image display region of the transflective liquid crystal device 100 constructed as above, as shown in FIG. 3, a plurality of pixels 100a are formed in a matrix shape, and a pixel electrode 9a and a TFT to provide pixel switching 30 to drive the pixel electrode 9a are formed in each pixel 100a, a data line 6a to supply pixel signals S1, S2, . . . and Sn is electrically connected to the source of the TFT 30. The pixel signals S1, S2, . . . and Sn input to the data line 6a can be supplied line-sequentially in this order, or can be supplied with group for a plurality of data lines 6a neighboring each other. Further, a scanning line 3a is electrically connected to the gate of the TFT 30, and scanning signals G1, G2, . . . and Gm are applied line-sequentially to the scanning line 3a in this order in pulse at a predetermined timing. The pixel electrode 9a is electrically connected to the drain of the TFT 30, and the pixel signals S1, S2, . . . and Sn supplied from the data line 6a are written on each pixel at a predetermined timing by maintaining the TFTs 30, which are switching elements, on-state only for a predetermined period. By doing so, the pixel signals S1, S2, . . . and Sn of a predetermined level, written in the liquid crystal through the pixel electrode 9a, are held between the pixel electrode 9a and a counter electrode 21 of the counter substrate 20 for a predetermined period.

The liquid crystal layer 50 changes the orientation or order of the molecular group according to the level of voltage applied to provide the light modulation and the gradation display. In a normally white mode, the quantity of the incident light passing through the liquid crystal layer 50 decreases according to the voltage applied. In a normally black mode, the quantity of the incident light passing through the liquid crystal layer 50 is increased according to the voltage applied. As a result, the light having the contrast according to pixel signals S1, S2, . . . and Sn is emitted from the transflective liquid crystal device 100 as a whole.

Further, to reduce or prevent the leak of the held pixel signals S1, S2, . . . and Sn, a storage capacitor 60 can be added parallel with a liquid crystal capacitor formed between the pixel electrode 9a and the counter electrode. For example, the voltage of the pixel electrode 9a is held by the storage capacitor 60 for a longer time as much as three digit period than the time applied by the source voltage. By such a structure, the maintenance characteristic of the charges is enhanced, and the transflective liquid crystal device 100 having a high contrast ratio can be realized. Further, as a method of forming the storage capacitor 60, either method of forming between capacitor lines 3b as wirings to form the storage capacitor 60, or method of forming between scanning lines 3a of leading ends as shown in FIG. 3 can be employed.

(Structure of a TFT Array Substrate)

Figure 4:
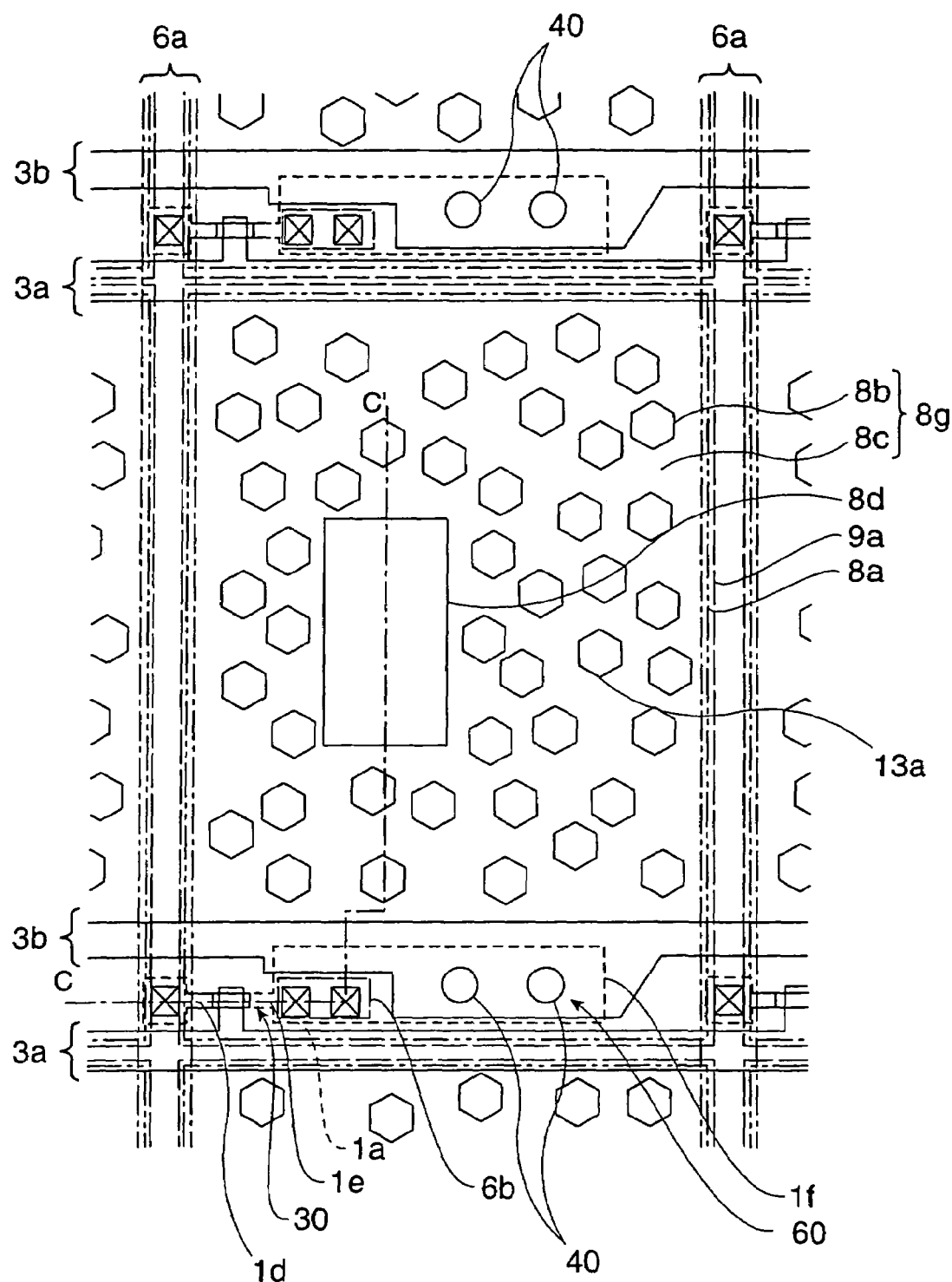
FIG. 4 is a plan view showing the configuration of each pixel on a TFT array substrate of the transflective liquid crystal device according to the present invention.
Figure 5:
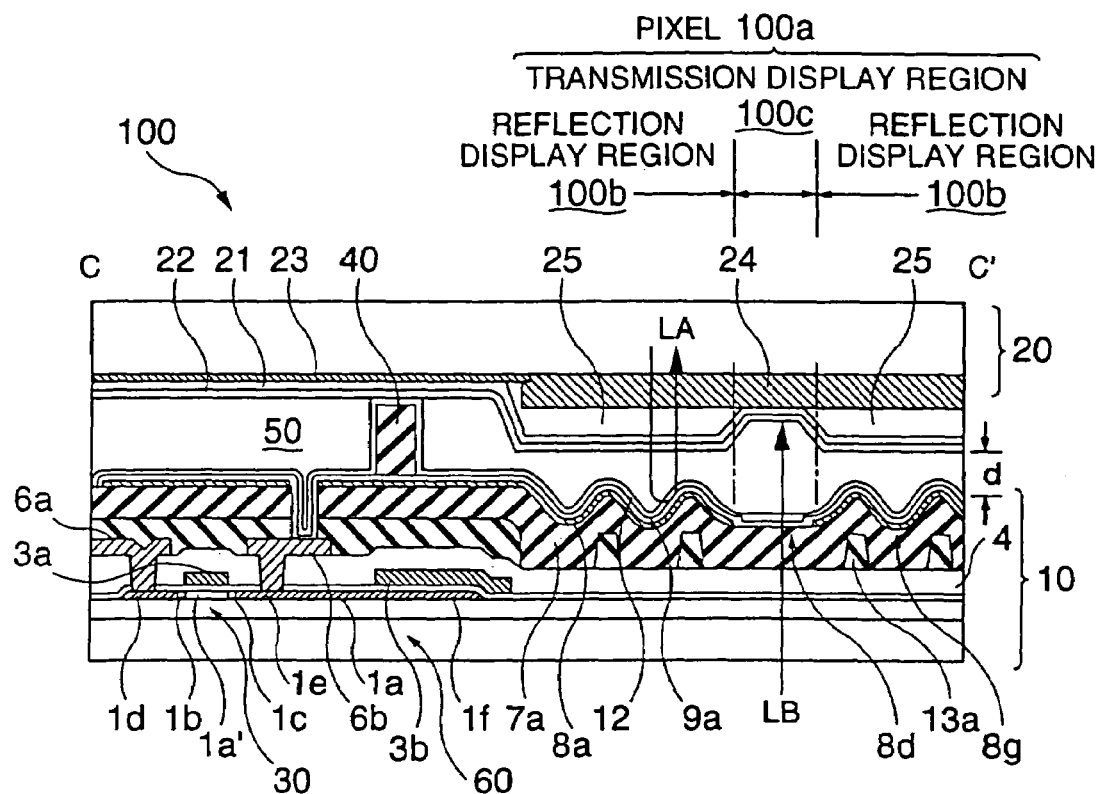
FIG. 5 is a sectional view of the transflective liquid crystal device according to a first exemplary embodiment of the present invention taken along plane C-C' of FIG. 4.

FIG. 4 is a plan view of a plurality of pixel groups neighboring each other in the TFT array substrate used in the transflective liquid crystal device of the present invention. FIG. 5 is a sectional view of a part of the pixel taken along plane C-C' of FIG. 4.

In FIG. 4, pixel electrodes 9a (first transparent electrode) made of a plurality of transparent ITO (Indium Tin Oxide) films are formed in a matrix shape on a TFT array substrate 10, and TFTs to provide pixel switching 30 are connected to each pixel electrode 9a. Further, data line 6a, scanning line 3a, and capacitor line 3b are formed along the longitudinal and horizontal boundary of the pixel electrode 9a, and the TFT 30 is connected with the data line 6a and the scanning line 3a. The data line 6a is electrically connected in a high density source region 1d through a contact hole, and the protrusion portion of scanning line 3a forms a gate electrode of the TFT 30. In addition, the storage capacitor 60 is configured such that an extension portion 1f of a semiconductor film 1 to form the TFT for switching pixel 30 becomes a lower electrode 41, and the capacitor line 3b as a upper electrode overlaps the lower electrode 41.

The sectional view of the pixel 100a constructed as above taken along plane C-C' is shown in FIG. 5, a foundation protecting film 11 made of a silicon oxide film (insulating film) of 300 to 500 nm in thickness is formed on the surface of a transparent substrate 10' as a base substance of the TFT array substrate 10, and an island-shaped semiconductor film 1a of 30 to 100 nm in thickness is formed on the surface of the foundation protecting film 11. A gate insulating film 2 made of a silicon oxide film of about 50 to 150 nm in thickness is formed on the surface of the semiconductor film 1a, and the scanning line 3a of 300 to 800 nm in thickness is formed on the surface of the gate insulating film 2. In the semiconductor film 1a, the region facing the scanning line 3a and having the gate insulating film 2 between them is a channel region 1a'. In the channel region 1a', a source region having a low density source region 1b and a high density source region 1d is formed in a part thereof, and a drain region having a low density drain region 1c and a high density drain region 1e is formed in other part thereof.

An interlayer insulating film 4 made of a silicon oxide film of 300 to 800 nm in thickness, is formed on the surface of the TFT to provide pixel switching 30, and a surface protecting film (not shown) made of a silicon nitride film of 100 to 300 nm in thickness, may be formed on the surface of the interlayer insulating film 4. A data line 6a, being 300 to 800 nm in thickness, is formed on the surface of the interlayer insulating film 4, and the data line 6a is electrically connected to a high density source region 1d through the contact hole formed on the interlayer insulating film 4. A drain electrode 6b, formed together with the data line 6a, is formed on the surface of the interlayer insulating film 4, and the drain electrode 6b is electrically connected to a high density drain region 1e through the contact hole formed on the interlayer insulating film 4.

An unevenness forming layer 13a made of a first photosensitive resin, is formed on the upper surface of the interlayer insulating film 4 with a predetermined pattern, and an upper-layer insulating film 7a made of a second photosensitive resin, is formed on the layer of the unevenness forming layer 13a. In addition, a light reflecting film 8a made of an aluminum film, etc., is formed on the surface of the upper-layer insulating film 7a. Therefore, an unevenness pattern 8g is formed on the surface of the light reflecting film 8a, the pattern having a concave portion 8c and a convex portion 8b by reflecting the unevenness of an unevenness forming layer 13a through the upper-layer insulating film 7a.

A light transmitting window 8d is formed on the light reflecting layer 8a. Due to such a structure, the light reflecting film 8a forms a reflection display region 100b in the pixel region 100a in which the pixel electrode 9a faces the counter electrode 21. Further, the remaining region in which the light reflecting film 8a is not formed (light transmitting window 8d) forms a transmission display region 100c.

The pixel electrode 9a made of an ITO film, is formed above the light reflecting film 8a. The pixel electrode 9a is directly laminated on the surface of the light reflecting film 8a, and the pixel electrode 9a is electrically connected to the light reflecting film 8a. Further, the pixel electrode 9a is electrically connected to the drain electrode 6b through the contact hole formed on the photosensitive resin layer 7a and the interlayer insulating film 4.

An oriented layer 12 made of polyimide film is formed on the surface of the pixel electrode 9a. The oriented layer 12 is a film in which a rubbing-treatment is performed for the polyimide film.

Further, a capacitor line 3b as an upper electrode faces the extension portion 1f (lower electrode) extended from the high density drain region 1e through an insulating film (dielectric film) formed together with the gate insulating film 2 to form a storage capacitor 60.

Further, this exemplary embodiment forms a plurality of columnar protrusion 40, of 2 to 3 μm in height and including transparent polyimide resin, etc. in each pixel 100a above the capacitor line 3b, and the interval between the TFT array substrate 10 and the counter substrate 20 is defined by such a columnar protrusion 40. Due to such a structure, a gap material is not dispersed between the TFT array substrate 10 and the counter substrate 20 in the transflective liquid crystal device 100 of the present invention.

Further, the TFT 30 preferably has an LDD structure as described above, or may have an off-set structure in which impurity ions are not injected in a region corresponding to a low density source region 1b and a low density drain region 1c. Further, the TFT 30 may be a self-align typed TFT in which a high density of impurity ions are injected using a gate electrode (a part of a scanning line 3a) as a mask, and a high density source and drain regions are formed in a self-matching manner.

Further, this exemplary embodiment has a single gate structure such that one gate electrode (scanning line 3a) of the TFT 30 is arranged between the source and the drain regions, but two or more gate electrodes can be arranged between them. In such a case, an identical signal is applied on each gate electrode. As above, if the TFT 30 has a structure of a dual-gate (double gate) or a triple gate or more, it is possible to reduce or prevent leak current in the connection portion of the channel and the source-drain regions, and is possible to reduce current in off-state. If at least one of the gate electrodes is made in an LDD structure or an in off-set structure, the off-set current can be further reduced, and a stable switching device can be achieved.

(Structure of a Counter Substrate)

The counter substrate 20 is configured such that a light shielding film 23, which is referred to as a black matrix or a black stripe, etc., is formed in the region facing the longitudinal and horizontal boundary portion of the pixel electrode 9a formed on the TFT array substrate 10, and the counter electrode 21 (a second electrode) made of an ITO film, is formed above the light shielding film 23. An alignment film 22, made of a polyimide film, is formed above the counter electrode 21, and the alignment film 22 is a film in which a rubbing treatment is performed for the polyimide film.

Further, below the counter electrode 21 of the counter substrate 20, RGB color filters 24, of 1 to several μm in thickness, are formed by using a photolithography technology, a flexographic printing or ink jet printing, in the reflection display region 100b and the transmission display region 100c. The color filters 24 are integrally formed in the reflection display region 100b and the transmission display region 100c, and the thickness thereof is uniform in the reflection display region 100b and the transmission display region 100c.

Further, in this exemplary embodiment, a layer-thickness adjusting layer 25 is formed between the counter electrode 21 and the color filter 24, that is, below the counter electrode 21 such that the layer thickness "d" of the liquid crystal layer 50 in the reflection display region 100b becomes thinner than the layer thickness "d" of the liquid crystal layer 50 in the transmission display region 100c. In this exemplary embodiment, the layer-thickness adjusting layer 25 is a transparent layer, of 2 to 3 μm in thickness and made of acryl resin or polyimide resin, etc., which is selectively formed in the reflection display region 100b by using a photolithography technology, a flexographic printing or ink jet printing.

(Operation and Effect of the Invention)

Therefore, in the liquid crystal structured as above, with regard to the light emitted from a backlight apparatus (not shown) disposed on the back side of the TFT array substrate 10, as the light incident into the transmission display region 100c, as indicated by arrow LB, the light is incident from the TFT array substrate 10 into the liquid crystal layer 50, and after it is light-modulated in the liquid crystal layer 50, it is emitted from the counter substrate 20 as a transmission display light to display images (transmission mode).

Further, with regard to the external light incident from the counter substrate 20, as the light incident into the reflection display region 100b, as indicated by LA, the light passes through the liquid crystal layer 50, reaches the light reflecting film 8a, is reflected from the light reflecting film 8a, passes through the liquid crystal layer 50 again, emitted from the counter substrate 20 as a reflecting display light to display images (reflection mode).

When performing such display, the reflection display light passes through the liquid crystal layer 50 twice, while the transmission display light is emitted by passing through the liquid crystal layer 50 just once, but in this exemplary embodiment, by the layer-thickness adjusting layer 25 formed in the reflection display region 100b, the layer thickness "d" of the liquid crystal layer 50 in the reflection display region 100b is formed considerably thinner than the layer thickness "d" of the liquid crystal layer 50 in the transmission display region 100c. Due to such a structure, the retardation (Δn·d) can be enhanced or optimized in both of the transmission display light and the reflection display light so as to perform a high quality display.

Further, in this exemplary embodiment, the layer-thickness adjusting layer 25 is formed on the counter substrate 20, that is, on the substrate in which a TFT for switching pixel 30 is not formed so that the layer thickness "d" of the liquid crystal layer 50 in the reflection display region 100b becomes thinner than the layer thickness "d" of the liquid crystal layer 50 in the transmission display region 100c. Due to such a structure, even though the layer-thickness adjusting layer 25 is provided, the exposure preciseness in a photolithography process to form the TFT 30 on the TFT array substrate 10 is not lowered. Therefore, the transflective liquid crystal device 100 having a high reliability and a high quality of display can be provided.

Further, in this exemplary embodiment, the interval between the TFT array substrate 10 and the counter substrate 20 is defined by a columnar protrusion 40 formed on the TFT array substrate 10, and a gap material is not dispersed between the TFT array substrate 10 and the counter substrate 20. Due to such a structure, even though an unevenness exists on the counter substrate 20 due to the layer-thickness adjusting layer 25 like the shape in this exemplary embodiment, a problem in which the device does not fulfill its function due to the gap material remaining in a concave portion, does not occur. Therefore, since the preciseness of the interval between the TFT array substrate 10 and the counter substrate 20 can be well defined, and the retardation (Δn·d) can be enhanced or optimized, accordingly a display can have a high quality.

Further, this exemplary embodiment provides an advantage that the layer-thickness adjusting layer 25 does not cause the non-uniformity of the film thickness of the color filter 24 even though the color filter 24 is formed by using a spin coating method, since the color filter 24 is formed before the layer-thickness adjusting layer 25 is formed.

Second Exemplary Embodiment

Figure 6:
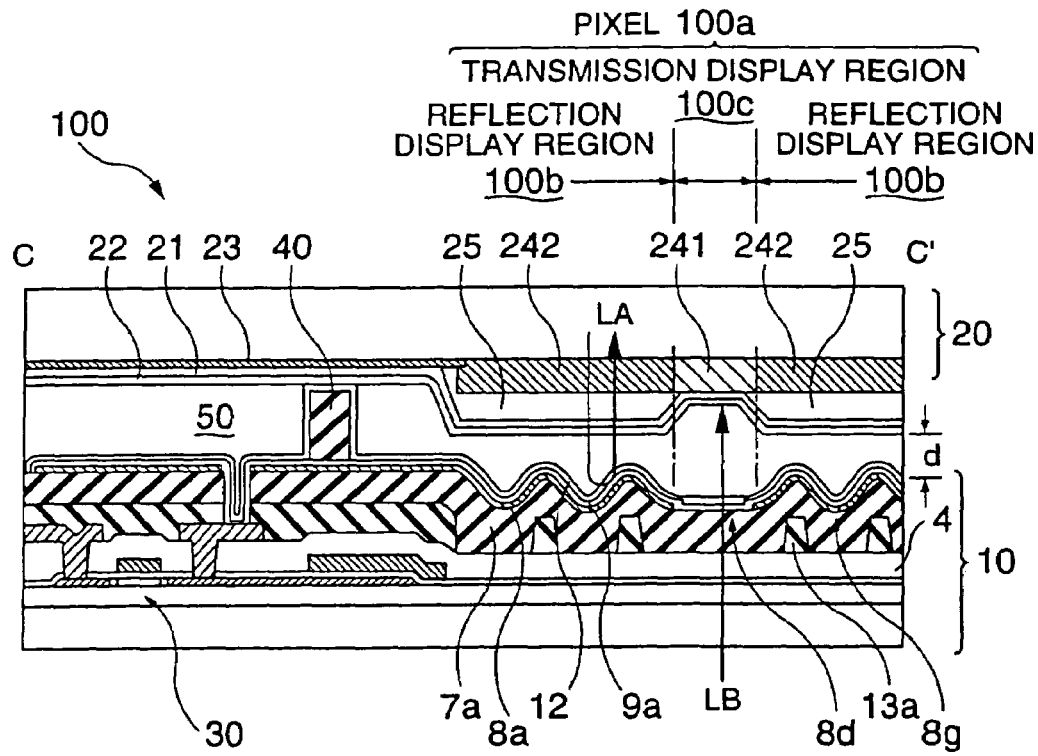
FIG. 6 is a sectional view of the transflective liquid crystal device according to a second exemplary embodiment of the present invention taken along plane C-C' of FIG. 4.

FIG. 6 is a sectional view of a part of the pixel of the transflective liquid crystal device according to a second exemplary embodiment of the present invention taken along plane C-C' of FIG. 4. Further, in the configuration of this exemplary embodiment and any configuration to be described below, a basic structure is the same as that of the first exemplary embodiment. Therefore, the common elements are designated with the same numerals to omit the description thereof, and only the structure of a counter substrate which is a feature of each exemplary embodiment are explained.

On a counter substrate 20 shown in FIG. 6, the layer thickness "d" of a liquid crystal layer 50 in a reflection display region 100b is considerably thinner than the layer thickness "d" of a liquid crystal layer 50 in a transmission display region 100c by a transparent layer-thickness adjusting layer 25 selectively formed in the reflection display region 100b. Due to such a structure, the retardation (Δn·d) can be enhanced or optimized in both of the transmission display light and the reflection display light so as to perform a high quality display.

Further, in this exemplary embodiment, the layer-thickness adjusting layer 25 is formed on the counter substrate 20, that is, on the substrate in which a TFT to provide pixel switching 30 is not formed so that the layer thickness "d" of the liquid crystal layer 50 in the reflection display region 100b becomes thinner than the layer thickness "d" of the liquid crystal layer 50 in the transmission display region 100c. Due to such a structure, even though the layer-thickness adjusting layer 25 is provided, the exposure preciseness in a photolithography process for forming the TFT 30 on the TFT array substrate 10 is not lowered. Therefore, the transflective liquid crystal device 100 having a high reliability and a high quality display can be provided.

Further in this exemplary embodiment, the interval between the TFT array substrate 10 and the counter substrate 20 is defined by the columnar protrusion 40 formed on the TFT array substrate 10, and a gap material is not dispersed between the TFT array substrate 10 and the counter substrate 20. Due to such a structure, even though a unevenness exists on the counter substrate 20 due to the layer-thickness adjusting layer 25 like the shape in this exemplary embodiment, a problem in which the device does not fulfill its function due to a gap material remaining in a concave portion, does not occur. Therefore, since the preciseness of the interval between the TFT array substrate 10 and the counter substrate 20 can be well defined, and the retardation (Δn·d) can be enhanced or optimized, accordingly a display can have a high quality.

Further, RGB color filters are formed in the reflection display region 100b and the transmission display region 100c below the counter electrode 21, and the color filter in this exemplary embodiment means a color filter for transmission display 241 formed in the transmission display region 100c, and a color filter for reflection display 242 formed in the reflection display region 100b, and they have the same film thickness, but the color filter for transmission display 241 has a wider chromaticity region than the color filter for reflection display 242 since they have different color materials or blending amount.

Therefore, in the transflective liquid crystal device 100, while the transmission display light is emitted by passing the color filter once, the reflection display light passes through the color filter twice. However, since the chromaticity region of the color filter for transmission display 241 is wider than that of the color filter for reflection display 242, images can be displayed with the same color in both of the transmission display light and the reflection display light.

If the color filter for transmission display 241 is made to be thicker than the color filter for reflection display 242, such that the chromaticity region of the color filter for transmission display 241 becomes wider than that of the color filter for reflection display 242, the effect by the layer-thickness adjusting layer 25 can be damaged. However, in this exemplary embodiment, since the chromaticity region of the color filter for transmission display 241 is made to be wider than that of the color filter for reflection display 242 according to the kinds of color materials or blending amount, damage to the effect of layer-thickness adjusting layer 25 is not caused.

Figure 7:
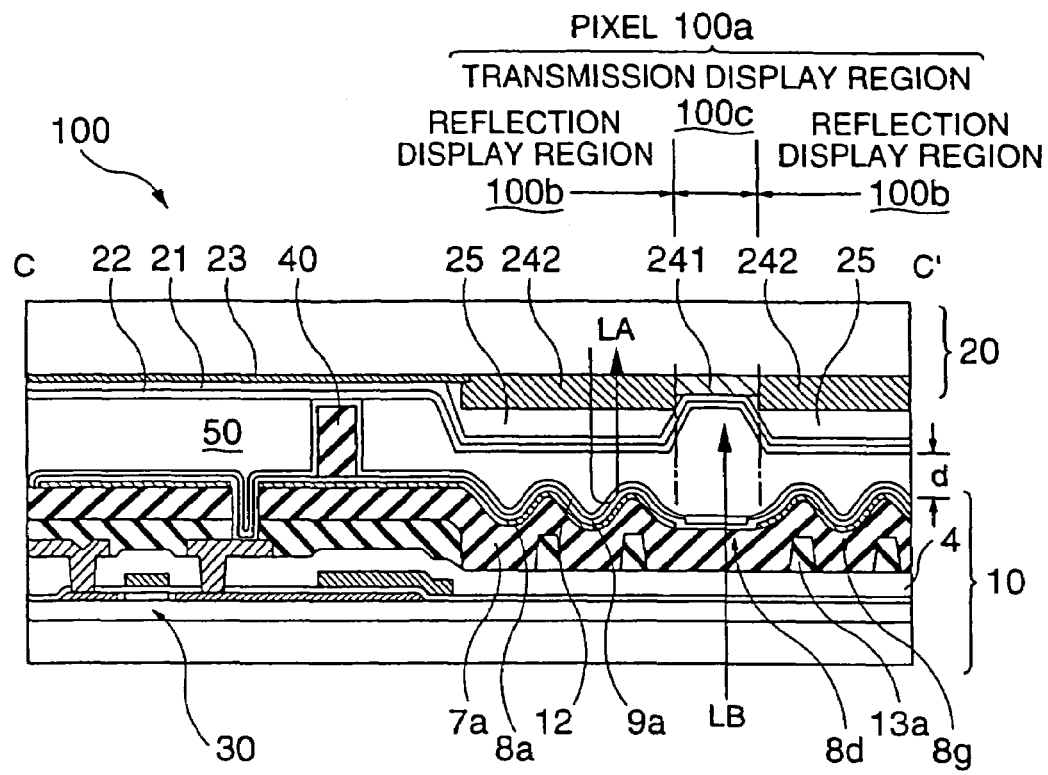
FIG. 7 is a sectional view of the transflective liquid crystal device according to an exemplary modification of a second exemplary embodiment of the present invention taken along plane C-C' of FIG. 4.

On the contrary, as shown in FIG. 7, by making the film thickness of the color filter for reflection display 242 thicker than that of the color filter for transmission display 241, the layer thickness balance of the liquid crystal layer 50 between the transmission display region 100c and the reflection display region 100b can be enhanced or optimized by the layer thickness difference of the color filters 241, 242 in addition to the layer-thickness adjusting layer 25.

Third Exemplary Embodiment

Figure 8:
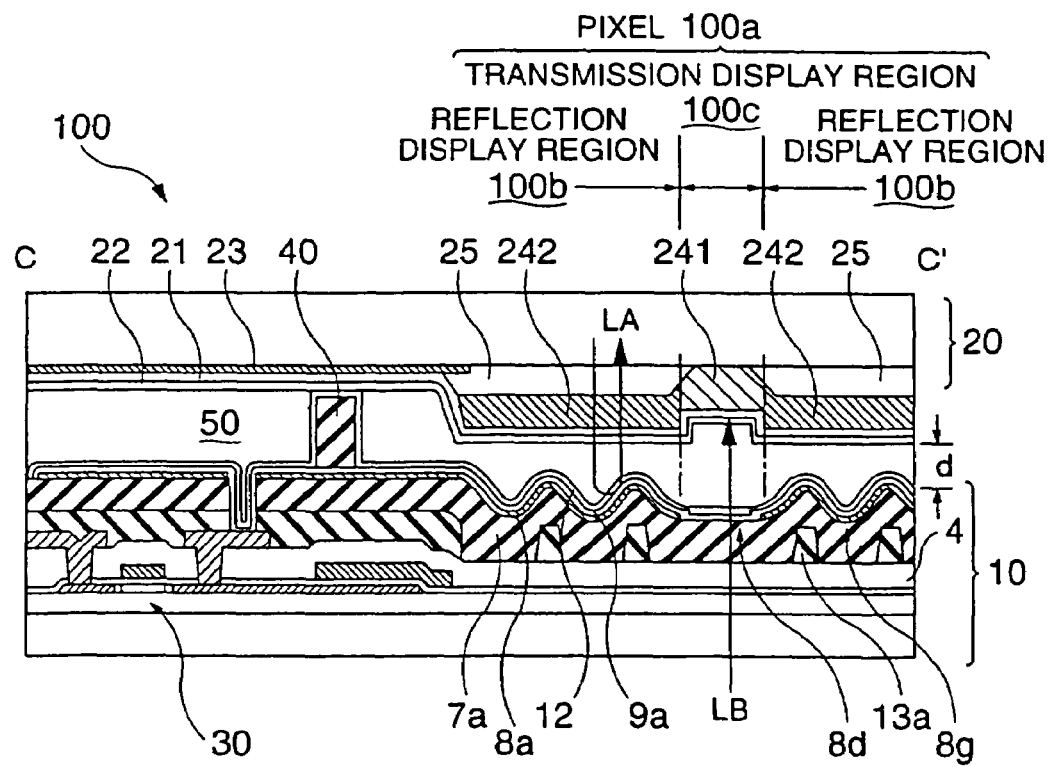
FIG. 8 is a sectional view of the transflective liquid crystal device according to a third exemplary embodiment of the present invention taken along plane C-C' of FIG. 4.

FIG. 8 is a sectional view of a part of the pixel of the transflective liquid crystal device according to a third exemplary embodiment of the present invention taken along plane C-C' of FIG. 4.

In the first and second exemplary embodiments, the layer-thickness adjusting layer 25 is formed between the counter electrode 21 and the color filter. However, in this exemplary embodiment, as shown in FIG. 8, a transparent layer-thickness adjusting layer 25 is selectively formed in a reflection display region 100b below a color filter for transmission display 241 formed in a transmission display region 100c, and a color filter for reflection display 242 formed in a reflection display region 100b.

Due to such a structure, the layer thickness "d" of a liquid crystal layer 50 in a reflection display region 100b is considerably thinner than the layer thickness "d" of a liquid crystal layer 50 in a transmission display region 100c. Therefore, the retardation (Δn·d) can be enhanced or optimized in both of the transmission display light and the reflection display light so as to perform a high quality display. Further, in this exemplary embodiment, by forming the layer-thickness adjusting layer 25 on the counter substrate 20, that is, on the surface in which the TFT to provide pixel switching 30 is not formed, since the layer thickness "d" of the liquid crystal layer 50 in the reflection display region 100b is made to be thinner than the layer thickness "d" of the liquid crystal layer 50 in the transmission display region 100c, even though the layer-thickness adjusting layer 25 is provided, the exposure preciseness in a photolithography process to form the TFT 30 on the TFT array substrate 10 is not lowered. Therefore, the transflective liquid crystal device 100 having a high reliability and a high quality of display can be provided.

Further, also in this exemplary embodiment, a chromaticity region of the color filter for transmission display 241 is wider than that of the color filter for reflection display 242. Therefore, images can be displayed with the same colors in both of the transmission display light and the reflection display light.

Further, since the interval between the TFT array substrate 10 and the counter substrate 20 is defined by a columnar protrusion 40 formed on the TFT array substrate 10, and a gap material is not dispersed between the TFT array substrate 10 and the counter substrate 20, even though an unevenness exists on the counter substrate 20 due to the layer-thickness adjusting layer 25, a problem in which the device does not fulfill its function due to the gap material remaining in a concave portion, does not occur. Therefore, since the preciseness of the interval between the TFT array substrate 10 and the counter substrate 20 can be well defined, and the retardation (Δn·d) can be enhanced or optimized. Accordingly a display can have a high quality.

Figure 9:
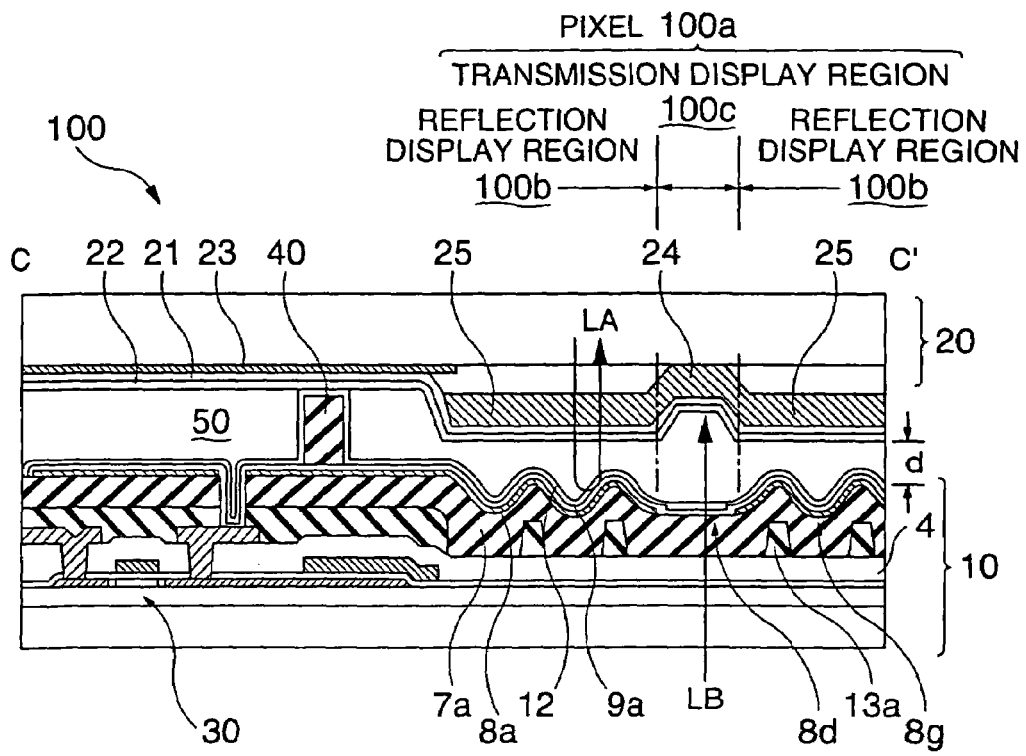
FIG. 9 is a sectional view of the transflective liquid crystal device according to an exemplary modification of a third exemplary embodiment of the present invention taken along plane C-C' of FIG. 4.

Further, in this exemplary embodiment, a chromaticity region of the color filter for transmission display 241 is wider than that of the color filter for reflection display 242. However, as shown in FIG. 9, the common color filter 24 can be formed in the reflection display region 100b and the transmission display region 100c.

Fourth Exemplary Embodiment

Figure 10:
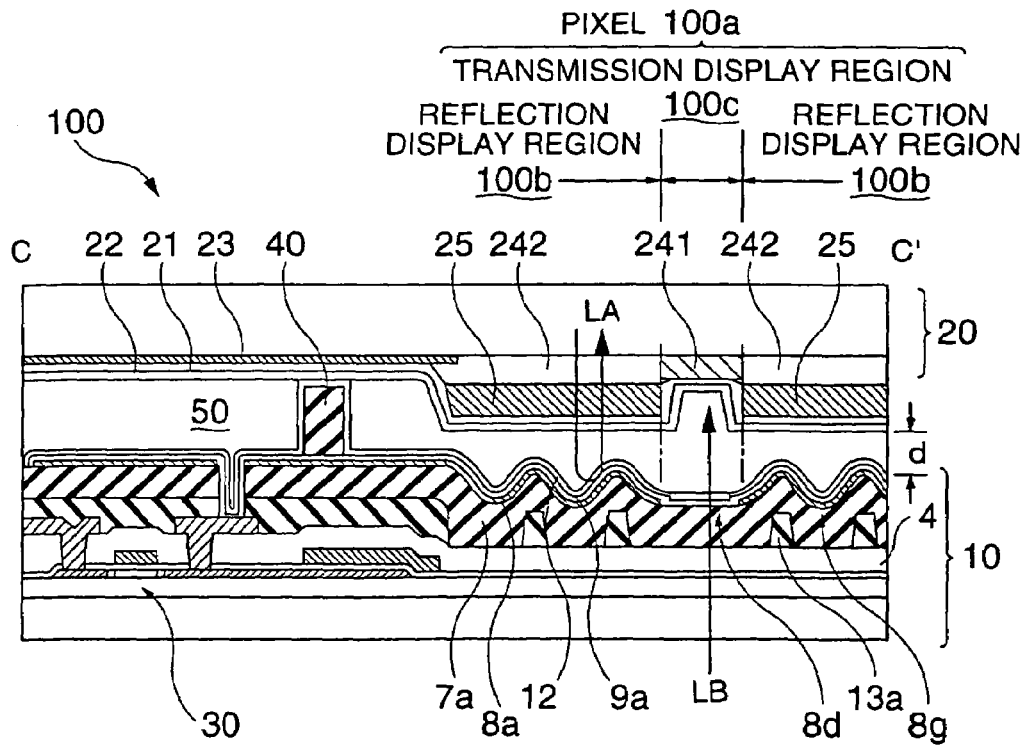
FIG. 10 is a sectional view of the transflective liquid crystal device according to a fourth exemplary embodiment of the present invention taken along plane C-C' of FIG. 4.

FIG. 10 is a sectional view of a part of the pixel of the transflective liquid crystal device according to a fourth exemplary embodiment of the present invention taken along plane C-C' of FIG. 4.

In the first and second exemplary embodiments, the layer-thickness adjusting layer 25 is formed between the counter electrode 21 and the color filter, and in the third exemplary embodiment, the layer-thickness adjusting layer 25 is formed below the color filter. However, in this exemplary embodiment, as shown in FIG. 10, a transparent layer-thickness adjusting layer 25 is selectively formed in a reflection display region 100b above a color filter for transmission display 241 formed in a transmission display region 100c, and a color filter for reflection display 242 is formed above the layer-thickness adjusting layer 25.

Also, in the transflective liquid crystal device 100 structured as above, the layer thickness "d" of a liquid crystal layer 50 in the reflection display region 100b is considerably thinner than the layer thickness "d" of a liquid crystal layer 50 in the transmission display region 100c. Therefore, the retardation (Δn·d) can be enhanced or optimized in both of the transmission display light and the reflection display light so as to perform a high quality display. Further, in this exemplary embodiment, by forming a layer-thickness adjusting layer 25 on a counter substrate 20, that is, on the surface which a TFT to provide pixel switching 30 is not formed, since the layer thickness "d" of the liquid crystal layer 50 in the reflection display region 100b is made to be thinner than the layer thickness "d" of the liquid crystal layer 50 in the transmission display region 100c, even though the layer-thickness adjusting layer 25 is provided, the exposure preciseness in a photolithography process to form the TFT 30 on the TFT array substrate 10 is not lowered. Therefore, the transflective liquid crystal device 100 having a high reliability and a high quality of display can be provided.

Further, in this exemplary embodiment, a chromaticity region of the color filter for transmission display 241 is wider than that of the color filter for reflection display 242. Therefore, images can be displayed with the same colors in both of the transmission display light and the reflection display light.

Further, since the interval between the TFT array substrate 10 and the counter substrate 20 is defined by a columnar protrusion 40 formed on the TFT array substrate 10, and a gap material is not dispersed between the TFT array substrate 10 and the counter substrate 20, even though an unevenness exists on the counter substrate 20 due to the layer-thickness adjusting layer 25, a problem in which the device does not fulfill its function due to the gap material remaining in a concave portion, does not occur. Therefore, since the preciseness of the interval between the TFT array substrate 10 and the counter substrate 20 can be well defined, and the retardation ($\Delta n \cdot d$) can be enhanced or optimized, accordingly a display can have a high quality.

Figure 11:
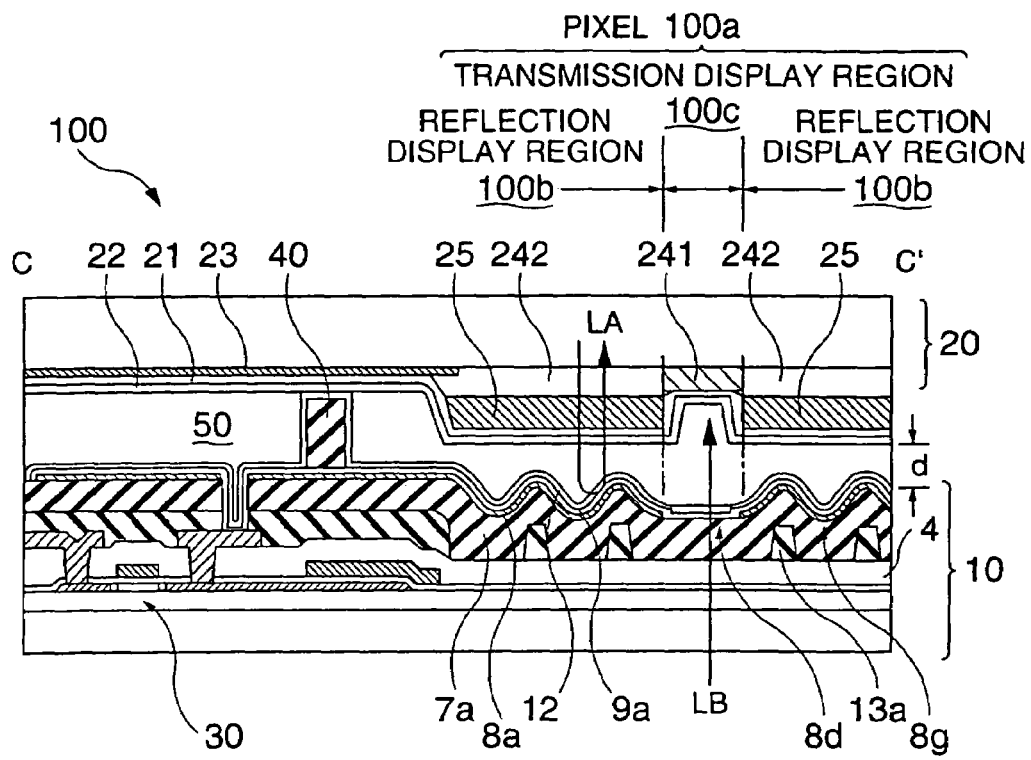
FIG. 11 is a sectional view of the transflective liquid crystal device according to an exemplary modification of a fourth exemplary embodiment of the present invention taken along plane C-C' of FIG. 4.

Further, in this exemplary embodiment, a chromaticity region of the color filter for transmission display 241 is wider than that of the color filter for reflection display 242. However, as shown in FIG. 11, color filters 241, 242 having the identical layer thickness and chromaticity region for the transmission display region 100c and the reflection display region 100b can be formed.

Fifth Exemplary Embodiment

Figure 12:
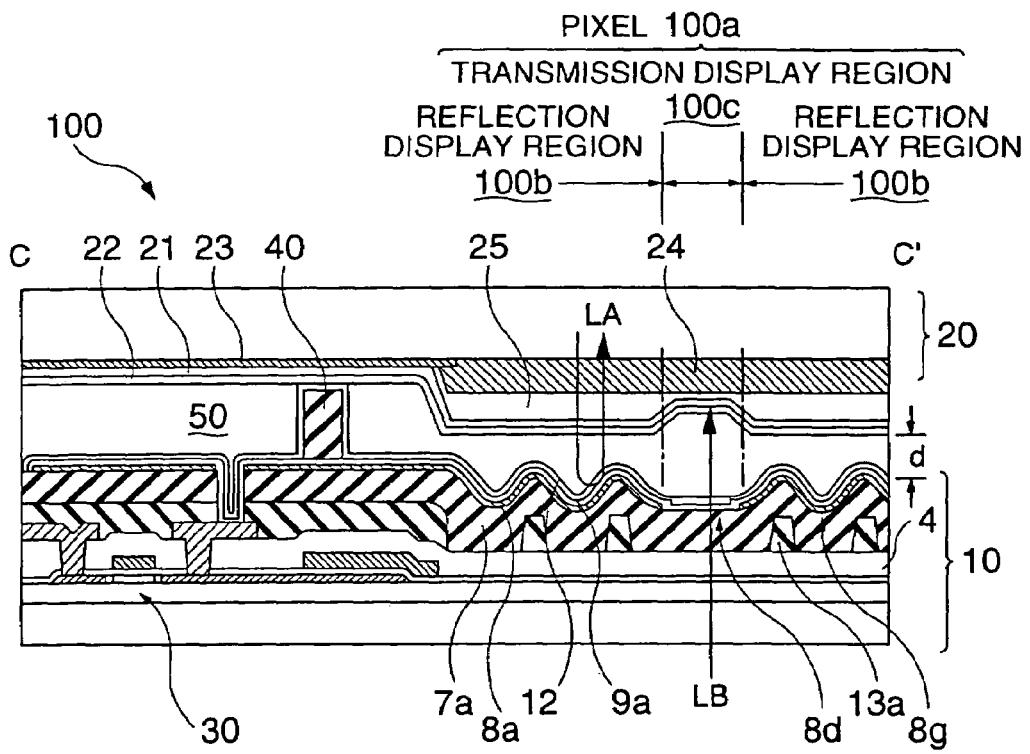
FIG. 12 is a sectional view of the transflective liquid crystal device according to a fifth exemplary embodiment of the present invention taken along plane C-C' of FIG. 4.

FIG. 12 is a sectional view of a part of the pixel of the transflective liquid crystal device according to a fifth exemplary embodiment of the present invention taken along plane C-C' of FIG. 4.

In the first, second, third and fourth exemplary embodiments, the layer-thickness adjusting layer 25 is selectively formed in reflection display region 100b, but for example, as shown in FIG. 12, a transparent layer being thin in a transmission display region 100c and being thick in a reflection display region 100b can be used as a layer-thickness adjusting layer 25. The layer-thickness adjusting layer 25 structured as above can be formed by a method of forming the transparent layer twice by a photolithography technology, a flexographic printing or ink jet printing, or by a photolithography technology of performing a half exposure.

Sixth Exemplary Embodiment

Figure 13:
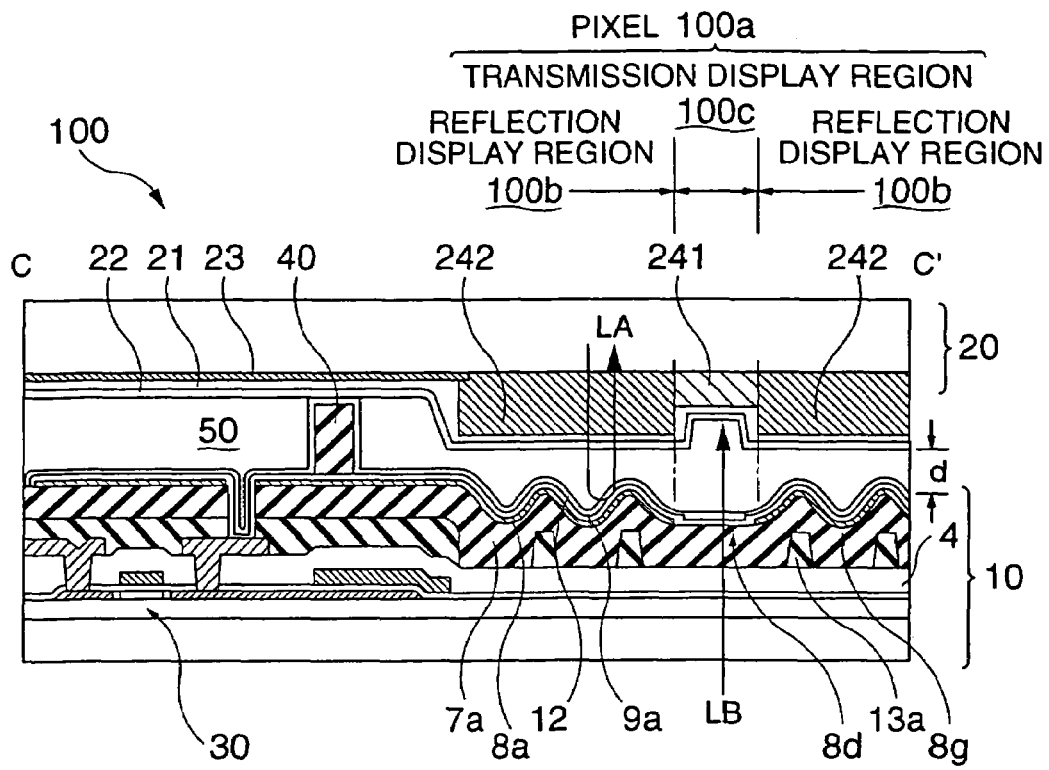
FIG. 13 is a sectional view of the transflective liquid crystal device according to a sixth exemplary embodiment of the present invention taken along plane C-C' of FIG. 4.

FIG. 13 is a sectional view of a part of the pixel of the transflective liquid crystal device according to a sixth exemplary embodiment of the present invention taken along plane C-C' of FIG. 4.

Each of the first to fifth exemplary embodiments provides a structure in which the layer-thickness adjusting layer 25 is formed below the counter electrode 21 as a transparent layer. However, in the sixth and seventh exemplary embodiments described below, a color filter itself can be used as a layer-thickness adjusting layer.

As shown in FIG. 13, the transflective liquid crystal device 100 of this exemplary embodiment has a thin color filter for transmission display 241 formed on a transmission display region 100c, and a thick color filter for reflection display 242 formed on a reflection display region 100b by using a photolithography technology, a flexographic printing or ink jet printing for a lower side of a counter electrode 21.

Due to such a structure, the layer thickness "d" of a liquid crystal layer 50 in a reflection display region 100b is considerably thinner than the layer thickness "d" of a liquid crystal layer 50 in a transmission display region 100c. Therefore, the retardation ($\Delta n \cdot d$) can be enhanced or optimized in both of the transmission display light and the reflection display light so as to perform a high quality display. Further, in this exemplary embodiment, by forming the layer-thickness adjusting layer 25 on the counter substrate 20, that is, on the surface which the TFT to provide pixel switching 30 is not formed on, since the layer thickness "d" of the liquid crystal layer 50 in the reflection display region 100b is made thinner than the layer thickness "d" of the liquid crystal layer 50 in the transmission display region 100c, even though the layer-thickness adjusting layer 25 is provided, the exposure preciseness in a photolithography process to form the TFT 30 on the TFT array substrate 10 is not lowered. Therefore, the transflective liquid crystal device 100 having a high reliability and a high quality of display can be provided.

Further, in this exemplary embodiment, the chromaticity region of a color filter for transmission display 241 is wider than that of the color filter for reflection display 242 according to the kinds of color materials or blending amount. Therefore, images can be displayed with the same colors in both of the transmission display light and the reflection display light.

Also in this exemplary embodiment, since the interval between the TFT array substrate 10 and the counter substrate 20 is defined by a columnar protrusion 40 formed on the TFT array substrate 10, and a gap material is not dispersed between the TFT array substrate 10 and the counter substrate 20, even though an unevenness exists on the counter substrate 20 due to the layer-thickness adjusting layer 25, a problem in which the device does not fulfill its function due to the gap material remaining in a concave portion, does not occur. Therefore, since the preciseness of the interval between the TFT array substrate 10 and the counter substrate 20 can be well defined, and the retardation ($\Delta n \cdot d$) can be enhanced or optimized, accordingly a display can have a high quality.

Figure 14:
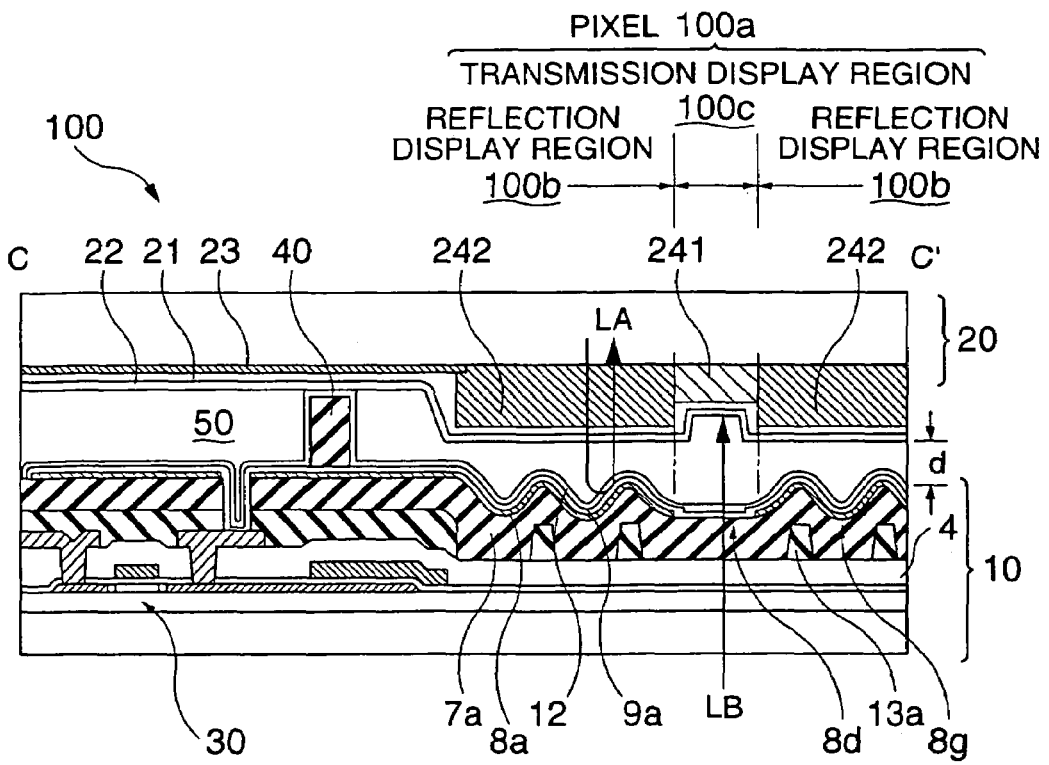
FIG. 14 is a sectional view of the transflective liquid crystal device according to an exemplary modification of a sixth exemplary embodiment of the present invention taken along plane C-C' of FIG. 4.

Further, in this exemplary embodiment, a chromaticity region of the color filter for transmission display 241 is wider than that of the color filter for reflection display 242. However, as shown in FIG. 14, color filters 241, 242, each including identical color materials but being different in the layer thickness, can be formed respectively in the transmission display region 100c and the reflection display region 100b.

Figure 15:
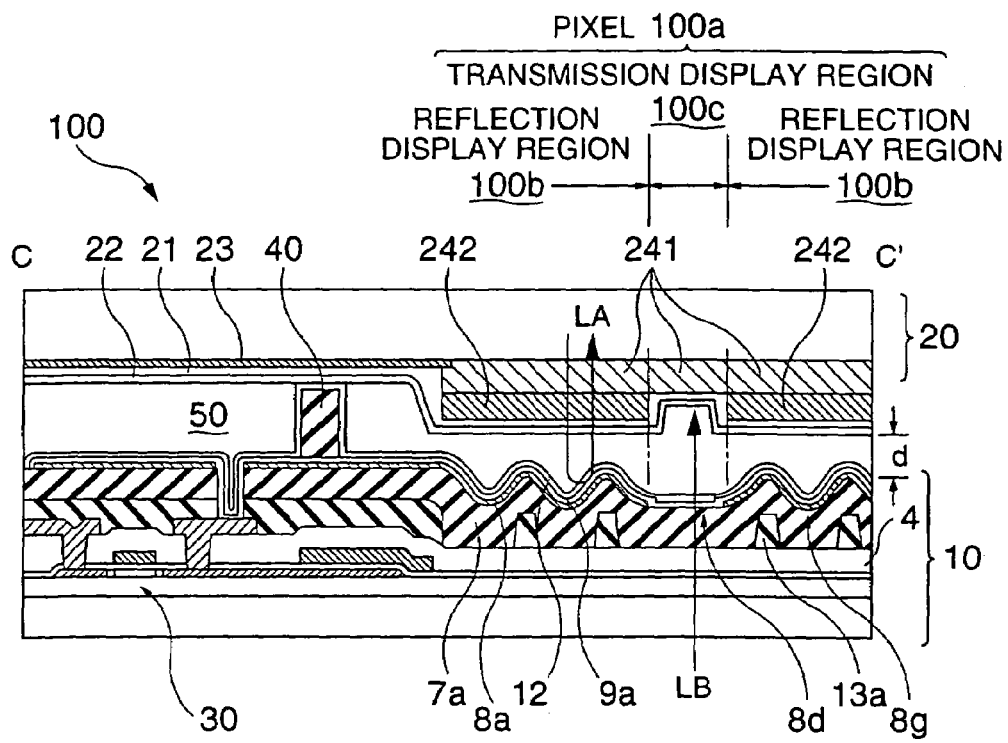
FIG. 15 is a sectional view of the transflective liquid crystal device according to another exemplary modification of a sixth exemplary embodiment of the present invention taken along plane C-C' of FIG. 4.

Further, as shown in FIG. 15, a structure in which a color filter 241 (a first color material layer), having the same chromaticity region and layer thickness as on the transmission display region 100c, and a color filter 242 (a second color material layer), including the different color material, are laminated on the reflection display region 100b can be employed so as to make a difference in the layer thickness.

Seventh Exemplary Embodiment

Figure 16:
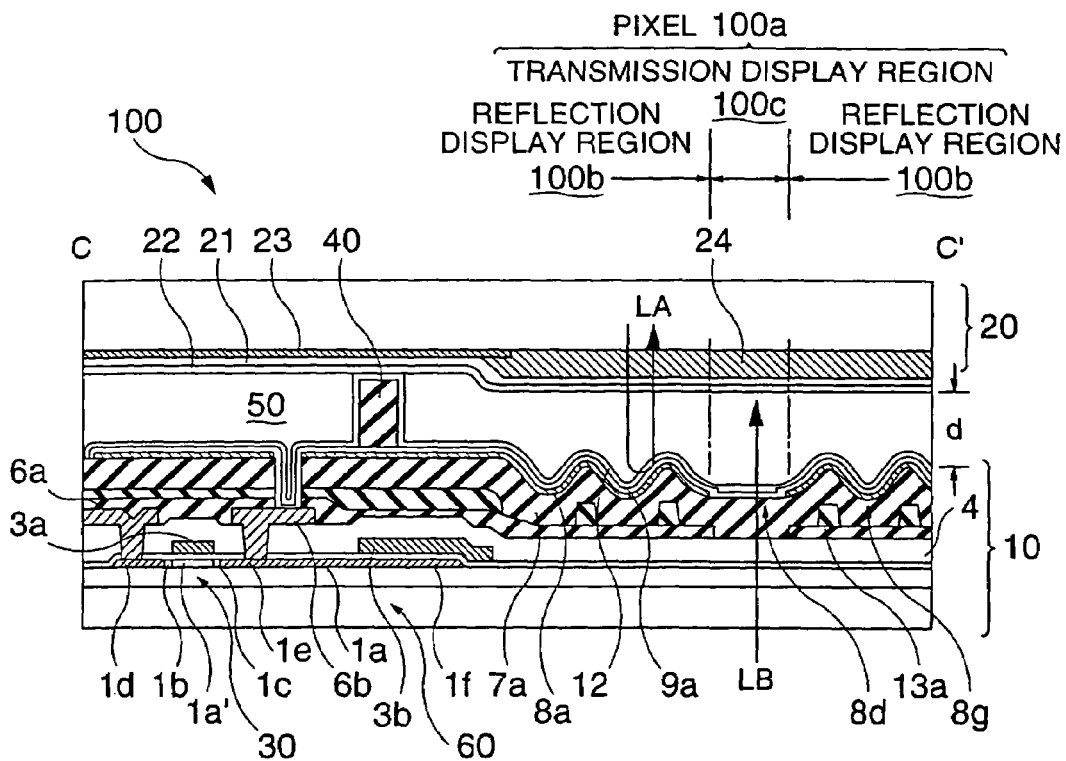
FIG. 16 is a sectional view of the transflective liquid crystal device according to a seventh exemplary embodiment of the present invention taken along plane C-C' of FIG. 4.

FIG. 16 is a sectional view of a part of the pixel of the transflective liquid crystal device according to a seventh exemplary embodiment of the present invention taken along plane C-C' of FIG. 4.

In the first to sixth exemplary embodiments, the layer-thickness adjusting layer 25 is formed on the counter substrate 20. However, as shown in FIG. 16, a layer-thickness adjusting layer 15, made of a photosensitive resin, can be selectively formed on a reflection display region 100b of a TFT array substrate 10 by using a photolithography technology, a flexographic printing method or ink jet printing method so as to enhance or optimize the retardation (Δn·d) in both of the transmission display light and the reflection display light.

Further, in the example shown in FIG. 16, the layer-thickness adjusting layer 15 is formed below an unevenness forming layer 13a. However, the layer-thickness adjusting layer 15 can be formed between any layers, only if it is the lower side of a pixel electrode 9a. Further, if an interlayer adjusting layer 15 is formed below the light reflecting film 8a, the layer-thickness adjusting layer 15 does not need to be limited to a transparent film.

Eighth Exemplary Embodiment

Figure 17:
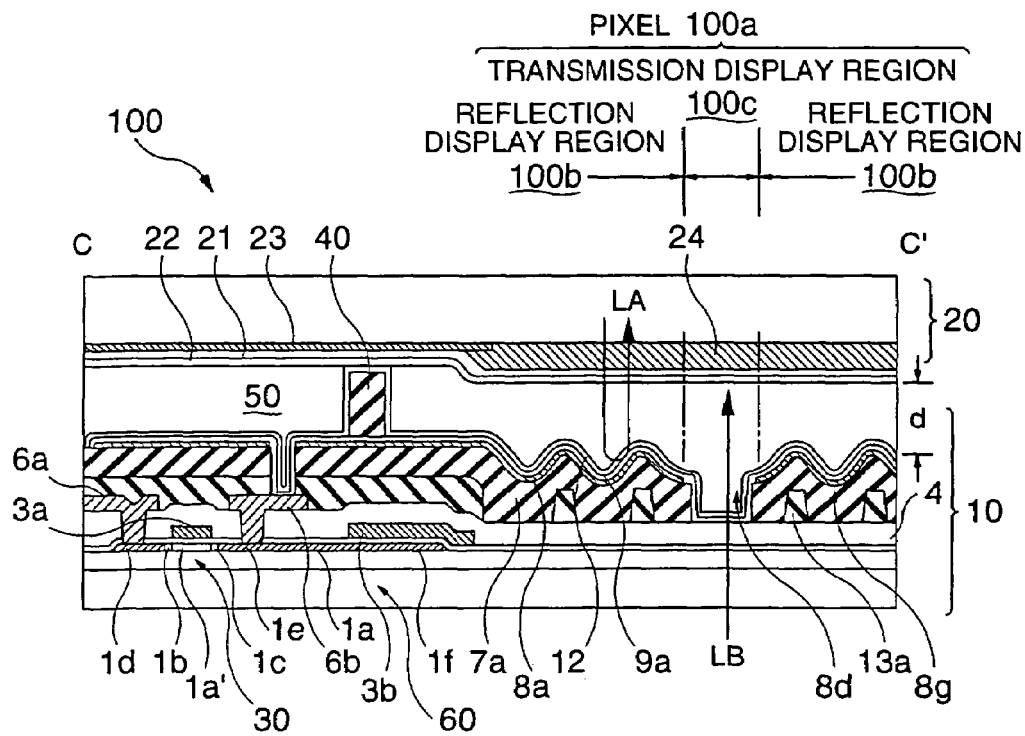
FIG. 17 is a sectional view of the transflective liquid crystal device according to an eighth exemplary embodiment of the present invention taken along plane C-C' of FIG. 4.

FIG. 17 is a sectional view of a part of the pixel of the transflective liquid crystal device according to an eighth exemplary embodiment of the present invention taken along plane C-C' of FIG. 4.

In the first to seventh exemplary embodiments, the retardation (Δn·d) in both of the transmission display light and the reflection display light is enhanced or optimized by adding the layer-thickness adjusting layers 15, 25. However, for example, as shown in FIG. 17, by eliminating an upper-layer insulating film 7a on the transmission display region 100c of the TFT array substrate 10, the total thickness of the films formed below the pixel electrode 9a is thick on the reflection display region 100b, and is thin on the transmission display region 100c so that the layer thickness "d" of a liquid crystal layer 50 can be adjusted.

Other Exemplary Embodiments

In the above exemplary embodiments, the examples of performing the adjustment of the substrate gap by the columnar protrusion 40 in the liquid crystal device having the layer-thickness adjusting layer 25 formed on the counter substrate 20 are illustrated. However, the adjustment of the substrate gap by the columnar protrusion 40 can be also performed in the liquid crystal device having the layer-thickness adjusting layer 25 formed on the TFT array substrate 10.

Further, the columnar protrusion 40 can be formed on the counter substrate 20.

Furthermore, in the above exemplary embodiments, the example of using a TFT as an active device for switching pixel is illustrated. However, a thin film diode device (TFD device), such as an MIM device (Metal Insulator Metal device), etc. as an active device in the same way can be also employed.

[Application of the Transflective Liquid Crystal Device in an Electronic Apparatus]

Figure 18:
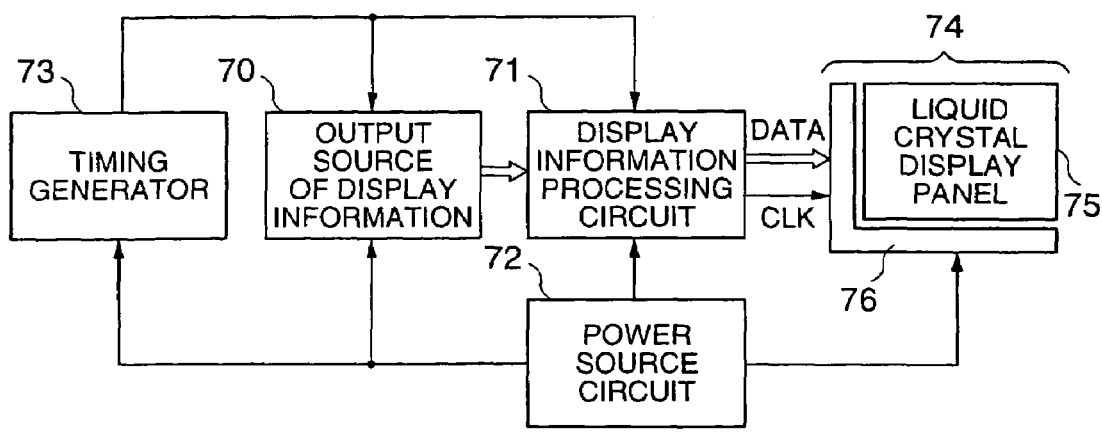
FIG. 18 is a schematic of the circuits of the electronic apparatus employing the transflective liquid crystal device according to the present invention as a display unit.
Figure 19:
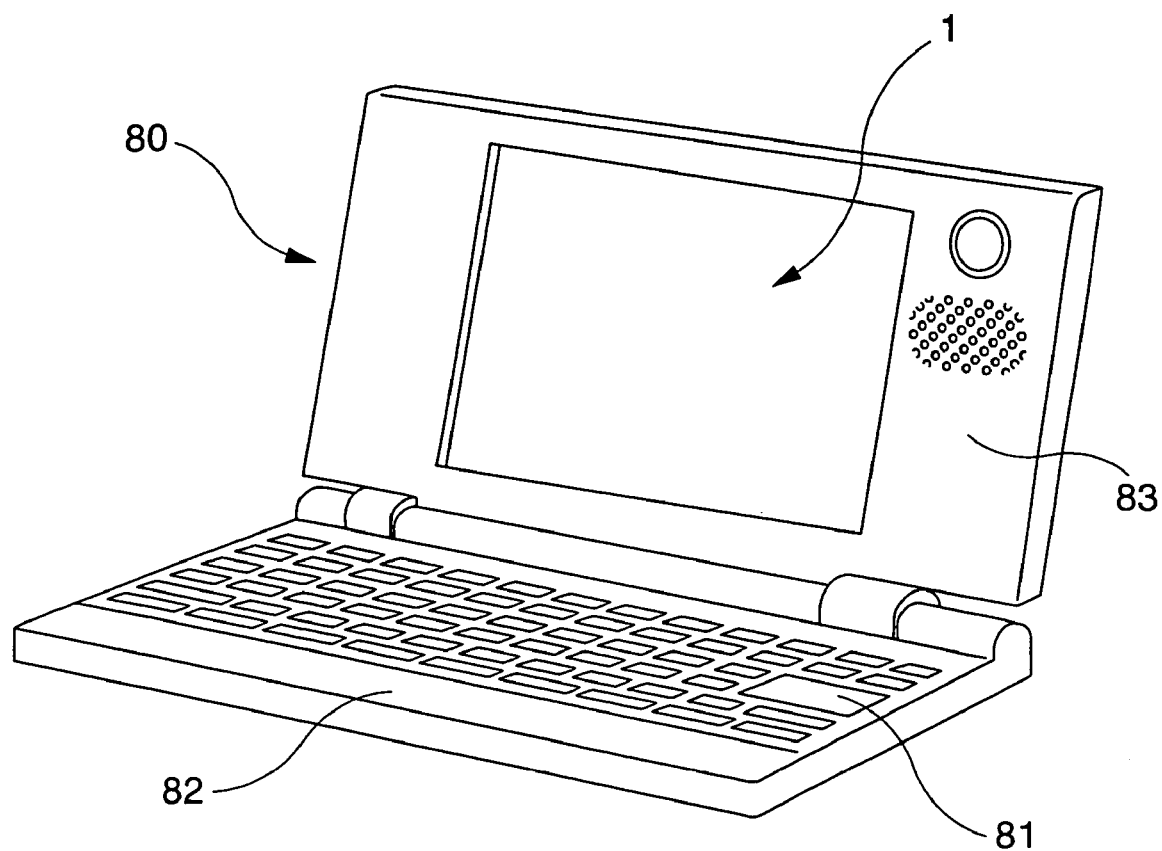
FIG. 19 is a schematic illustrating a portable personal computer using the transflective liquid crystal device according to the present invention.
Figure 20:
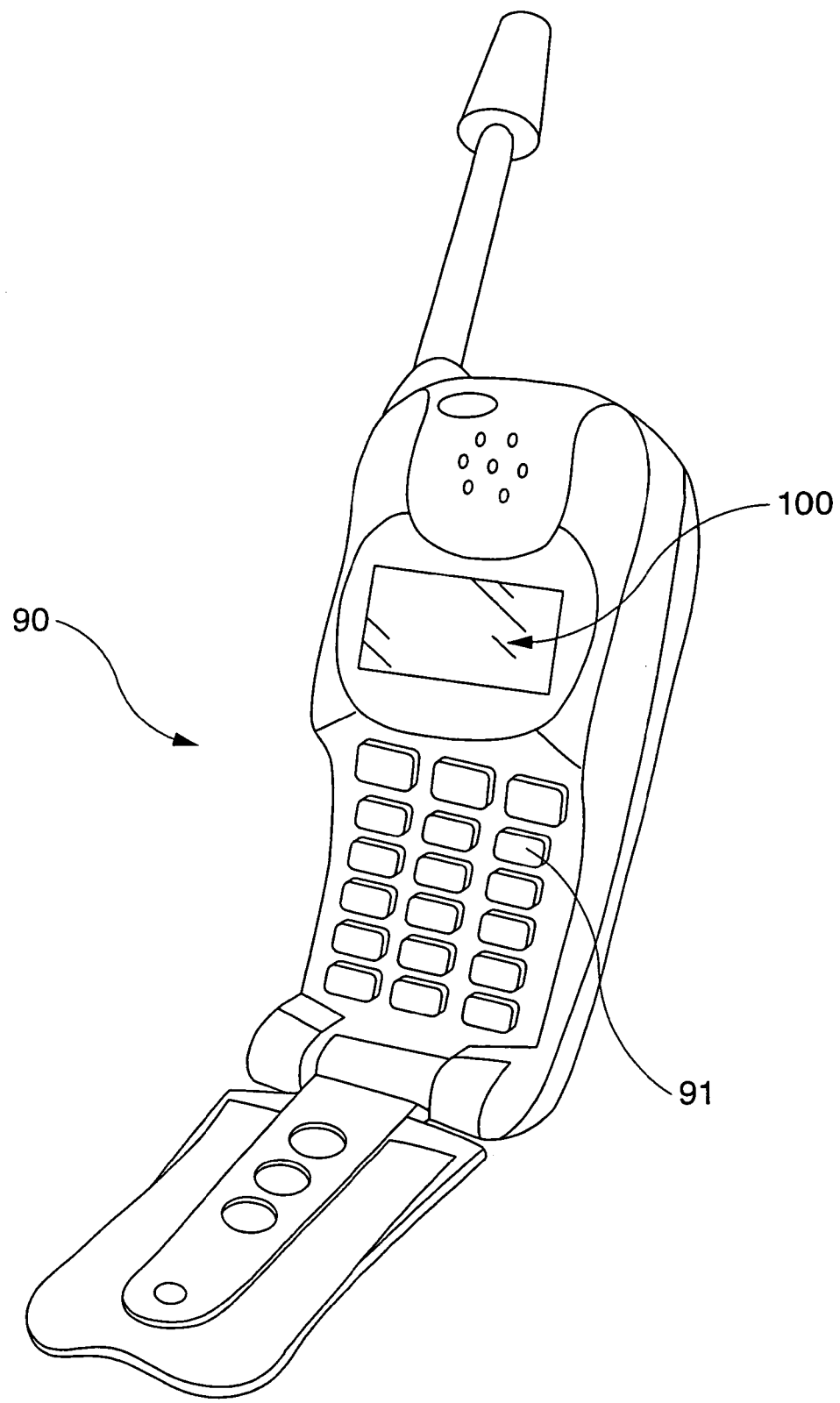
FIG. 20 is a schematic illustrating a mobile telephone using the transflective liquid crystal device according to the present invention.
Figure 21:
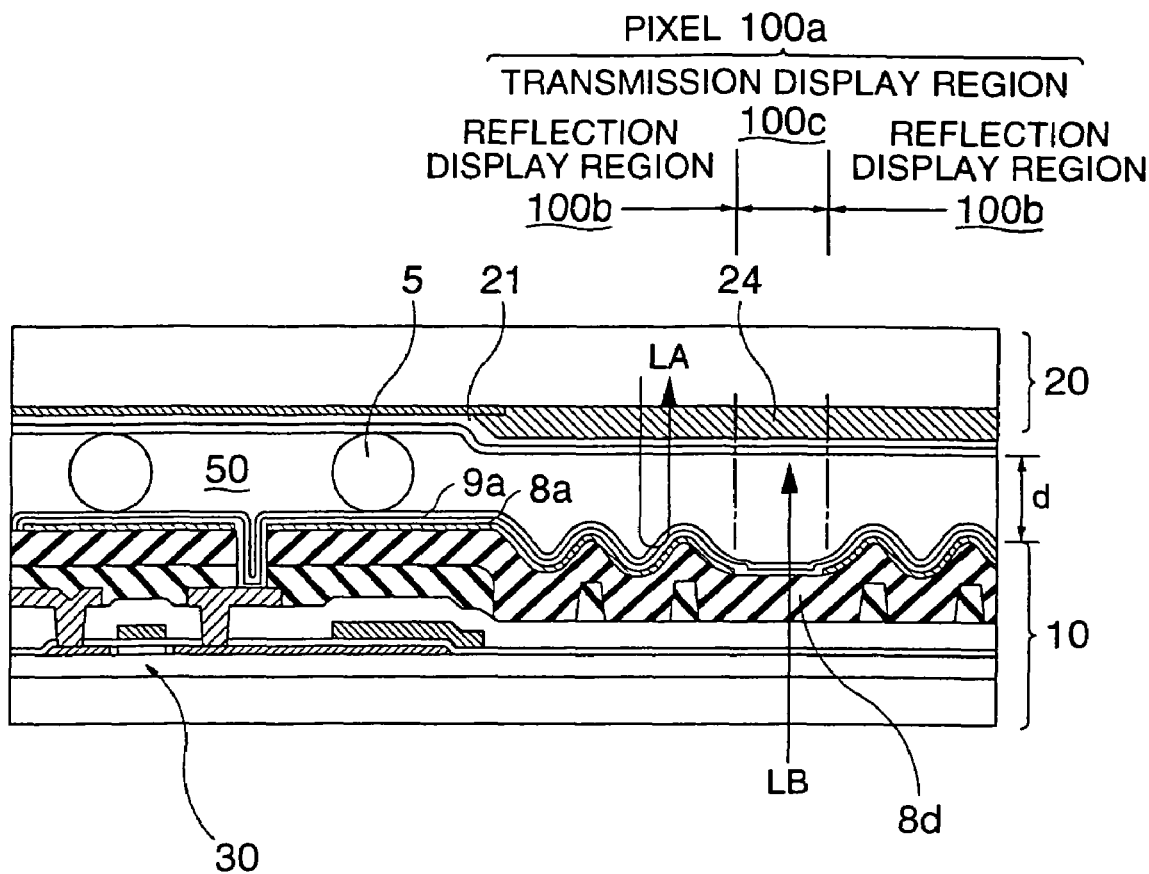
FIG. 21 is a sectional view of a related art transflective liquid crystal device.

The transflective liquid crystal device 100 structured as above can be used as a display unit of various electronic apparatus, and the examples are explained in reference to FIGS. 18-20.

FIG. 18 is a schematic of the circuits of the electronic apparatus using the transflective liquid crystal device according to the present invention as a display unit.

In FIG. 18, the electronic apparatus includes an output source of display information 70, a display information processing circuit 71, a power source circuit 72, a timing generator 73, and a liquid crystal device 74. In addition, the liquid crystal device 74 includes a liquid crystal display panel 75 and a driving circuit 76. The transflective liquid crystal device 100 as described above can be used as the liquid crystal device 74.

The output source of display information 70 includes a memory, such as an ROM (Read Only Memory), an RAM (Random Access Memory), etc., a storage unit, such as various disks, etc., and a tuning circuit to tune-output digital image signals, or the like, and display information, such as image signals in a predetermined format, is supplied to the display information processing circuit 71 according to various clock signals generated by the timing generator 73.

The display information processing circuit 71 includes related art, later developed or widely-known various circuits, such as a serial-parallel conversion circuit, an amplification•inversion circuit, a rotation circuit, a gamma correction circuit, a clamp circuit, etc., for example, and performs the processing of input display information so as to supply the image signal to the driving circuit 76 along with the clock signal (CLK). The power source circuit 72 supplies a predetermined voltage to each component element.

FIG. 19 illustrates a portable personal computer as one example of the electronic apparatus according to the present invention. The personal computer 80 includes a body unit 82 having a keyboard 81, and a liquid crystal display unit 83. The liquid crystal display unit 83 is structured to include the transflective liquid crystal device 100 as described above.

FIG. 20 illustrates a mobile phone as another example of the electronic apparatus according to the present invention. The mobile phone 90 includes a plurality of manipulating buttons 91 and a display unit provided with the transflective liquid crystal device 100 as described above.

EFFECTS OF THE INVENTION

As described above, according to the present invention, since the layer thickness of the liquid crystal layer in the reflection display region is made to be thinner than the layer thickness of the liquid crystal layer in the transmission display region on the first transparent substrate and the second transparent substrate, even though the reflection display light passes through the liquid crystal layer twice while the transmission display light is emitted out after passing through the liquid crystal layer only once, the retardation (Δn·d) can be enhanced or optimized in both of the transmission display light and the reflection display light. Further, in the present invention, even though an unevenness is formed on the surface of the first transparent substrate or the second transparent substrate by adjusting the thickness of the liquid crystal layer, the substrate gap can be adjusted by the columnar protrusion formed on the first transparent substrate or the second transparent substrate, and a gap material is not dispersed. Due to such a structure, the non-uniformity of the substrate gap does not occur due to a gap material coming into a concave portion of the unevenness due to the layer-thickness adjusting layer between the first transparent substrate and the second transparent substrate, the retardation (Δn·d) can be held in an enhanced or optimum state. Therefore, a high quality of display can be performed.

What is claimed is:

1. A transflective liquid crystal device, comprising:
a first transparent substrate having first transparent electrodes and pixel switching elements formed on a surface in a matrix;
a second transparent substrate having second transparent electrodes formed on a surface facing the first transparent electrodes;
a liquid crystal layer held between the first transparent substrate and the second transparent substrate;

a light reflecting layer formed on the first transparent substrate, the light reflecting layer having a reflection display region formed in a pixel in which the first transparent electrode faces the second transparent electrode and a transmission display region formed in the remaining region of the pixel, the first transparent substrate and the second transparent substrate being formed such that a layer thickness of the liquid crystal layer in the reflection display region is thinner than the layer thickness of the liquid crystal layer in the transmission display region;

a columnar protrusion formed on a surface facing the liquid crystal layer of at least one of the first transparent substrate and the second transparent substrate, the columnar protrusion defining the substrate gap between the first transparent substrate and the second transparent substrate by protruding from one of the substrates and abutting against the other substrate; and a layer-thickness adjusting layer formed on the surface facing the liquid crystal layer of one transparent substrate of the first transparent substrate and the second transparent substrate such that the layer thickness of the liquid crystal layer in the reflection display region becomes thinner than the layer thickness of the liquid crystal layer in the transmission display region, the layer-thickness adjusting layer being formed on the second transparent substrate, and including a color filter for transmission display which is thinly formed in the transmission display region, and a color filter for reflection which is formed thicker in the reflection display region than the color filter for transmission display in the pixel.

2. The transflective liquid crystal device according to claim 1, the color filter for transmission display being formed from a first color material layer which is thin and has a wide chromaticity region, and the color filter for reflection display being formed from a second color material layer which is thicker than and has a narrower chromaticity region than the first color material layer.

3. The transflective liquid crystal device according to claim 1, the color filter for transmission display being formed from a first color material layer, and the color filter for reflection display being formed from a first color material layer integrally formed with the color filter for transmission display, and a second color material layer being laminated above or below the first color material layer.

* * * * *